United States Patent
He et al.

(10) Patent No.: US 11,425,659 B2
(45) Date of Patent: Aug. 23, 2022

(54) PERIODIC RECEPTION MODE FOR WIRELESS COMMUNICATIONS

(71) Applicant: QUALCOMM Incorporated, San Diego, CA (US)

(72) Inventors: Linhai He, San Diego, CA (US); Gavin Bernard Horn, La Jolla, CA (US)

(73) Assignee: QUALCOMM Incorporated, San Diego, CA (US)

( * ) Notice: Subject to any disclaimer, the term of this patent is extended or adjusted under 35 U.S.C. 154(b) by 97 days.

(21) Appl. No.: 16/704,949

(22) Filed: Dec. 5, 2019

(65) Prior Publication Data
US 2020/0229099 A1 Jul. 16, 2020

Related U.S. Application Data

(60) Provisional application No. 62/792,801, filed on Jan. 15, 2019.

(51) Int. Cl.
*H04W 52/02* (2009.01)
*H04L 1/18* (2006.01)
(Continued)

(52) U.S. Cl.
CPC ....... *H04W 52/0251* (2013.01); *H04L 1/1819* (2013.01); *H04W 52/0216* (2013.01);
(Continued)

(58) Field of Classification Search
CPC ......... H04W 52/0251; H04W 52/0216; H04W 52/0274; H04W 80/02; H04W 76/27;
(Continued)

(56) References Cited

U.S. PATENT DOCUMENTS

2014/0105087 A1* 4/2014 Gupta ................. H04L 1/06
 370/311
2015/0365995 A1* 12/2015 Tabet .................. H04W 76/28
 370/311
(Continued)

FOREIGN PATENT DOCUMENTS

WO WO-2012051151 A1 * 4/2012 ........... H04B 7/2606
WO WO-2018034611 A1 * 2/2018 ........... H04L 1/1829

OTHER PUBLICATIONS

Samsung, UE adaptation schemes, 3GPP TSG RAN WG1 Meeting #95, Spokane, USA, Nov. 12-16, 2018, R1-1813011. (Year: 2018).*
(Continued)

*Primary Examiner* — Shailendra Kumar
(74) *Attorney, Agent, or Firm* — Qualcomm Incorporated

(57) ABSTRACT

Methods, systems, and devices for wireless communications are described. A periodic reception mode may be activated for a user equipment (UE), such as by receiving an activation signal. The UE may be configured with or otherwise determine a periodic schedule associated with the periodic reception mode. The base station may combine multiple packets of data and may transmit the combined data packet in accordance with the periodic schedule. The UE may identify a duration for an active state and a duration for an idle state based on the periodic schedule. The UE may monitor a control channel in accordance with a duration for the active state associated with the periodic reception mode and may sleep in accordance with a duration for the idle state associated with the periodic reception mode.

28 Claims, 17 Drawing Sheets

(51) Int. Cl.
| | |
|---|---|
| *H04W 72/04* | (2009.01) |
| *H04W 72/12* | (2009.01) |
| *H04W 76/27* | (2018.01) |
| *H04W 76/28* | (2018.01) |
| *H04W 80/02* | (2009.01) |

(52) U.S. Cl.
CPC ..... *H04W 52/0274* (2013.01); *H04W 72/042* (2013.01); *H04W 72/1268* (2013.01); *H04W 76/27* (2018.02); *H04W 76/28* (2018.02); *H04W 80/02* (2013.01)

(58) Field of Classification Search
CPC ............. H04W 76/28; H04W 72/1268; H04W 72/042; H04W 72/1236; H04W 72/1252; H04W 72/1289; H04W 52/0235; H04W 52/0229; H04W 52/0209; H04W 28/0221; H04L 1/1819; H04L 1/1896; H04L 1/1887; Y02D 30/70
See application file for complete search history.

(56) References Cited

U.S. PATENT DOCUMENTS

| | | | |
|---|---|---|---|
| 2016/0119969 A1* | 4/2016 | Vajapeyam | H04W 24/10 370/329 |
| 2016/0242087 A9* | 8/2016 | Wang | H04W 28/08 |
| 2017/0223584 A1* | 8/2017 | Deng | H04W 76/28 |
| 2018/0129263 A1 | 5/2018 | Zhu et al. | |
| 2018/0220371 A1* | 8/2018 | Agarwal | H04W 52/0229 |
| 2020/0205062 A1* | 6/2020 | Azizi | H04W 68/005 |
| 2020/0413341 A1* | 12/2020 | Xu | H04W 52/0229 |

OTHER PUBLICATIONS

International Search Report and Written Opinion—PCT/US2019/064886—ISA/EPO—dated Feb. 19, 2020.

* cited by examiner

PERIODIC RECEPTION MODE FOR WIRELESS COMMUNICATIONS

CROSS REFERENCE

The present Application for Patent claims the benefit of U.S. Provisional Patent Application No. 62/792,801 by HE et al., entitled "PERIODIC RECEPTION MODE FOR WIRELESS COMMUNICATIONS," filed Jan. 15, 2019, which is assigned to the assignee hereof and is expressly incorporated herein.

BACKGROUND

The following relates generally to wireless communications, and more specifically to a periodic reception mode for wireless communications.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include a number of base stations or network access nodes, each simultaneously supporting communication for multiple communication devices, which may be otherwise known as user equipment (UE).

In some cases, the arrival rate at a base station of data for a UE may not depend on (e.g., may not vary in response to changes in) the throughput supported by a wireless link between the base station and the UE, and thus the data for the UE may be referred to as inelastic (e.g., inelastic traffic or inelastic data). For example, a server or other component of a network may artificially limit (throttle) a data rate for the UE such that the rate at which data for the UE arrives at the base station may be static (e.g., capped) even if the throughput (e.g., supported or possible throughput) of the wireless link to the UE increases. This may occur, for example, if the UE is accessing a streaming service, and the server or other component of the network is configured to minimize loading and resource waste. As another non-limiting example, a bottleneck may exist somewhere in a network other than between the base station and the UE (e.g., in a core network of the wireless communications network or in the Internet), such that the rate at which data for the UE arrives at the base station may not change even if the throughput of the wireless link to the UE increases or decreases within a range above the rate supported by the bottleneck.

SUMMARY

The described techniques relate to improved methods, systems, devices, and apparatuses that support a periodic reception mode for wireless communications. Generally, the described techniques provide for improved power savings at UEs. Some wireless communications systems support UEs achieving power savings by operating in a periodic reception mode. In a periodic reception mode, a UE may transition between an active state for data transmission and reception and an inactive state, for power conservation. A base station may determine that a rate of data arrival does not change with the throughput of the wireless link associated with the UE. To account for such inelastic traffic, the base station may combine multiple packets, and may transmit the combined transmission as a data burst. The UE may identify an activation of a periodic reception mode. For example, the UE may receive an activation signal form the base station. The activation signal may activate a periodic reception mode at the UE. In some cases, the activation signal may indicate a periodic schedule including durations and periodicities of an active state (such as data transmission and/or reception period) and an inactive state (such as a low power period) for the UE. The UE may be configured with or otherwise identify the durations of the active state and the inactive state. In some cases, the UE may identify the durations based on the activation signal. The UE may determine if data is available by monitoring a control channel, such as a physical downlink control channel (PDCCH), in accordance with an active state indicated in the periodic schedule associated with the periodic reception mode. Additionally, the UE may sleep in accordance with the inactive state indicated in the periodic schedule associated with the periodic reception mode.

A method of wireless communication is described. The method may include identifying an activation of a periodic reception mode, monitoring, based on identifying the activation of the periodic reception mode, a control channel in accordance with a periodic schedule associated with the periodic reception mode, and sleeping, based on identifying the activation of the periodic reception mode, in accordance with the periodic schedule associated with the periodic reception mode.

An apparatus for wireless communication is described. The apparatus may include a processor, memory in electronic communication with the processor, and instructions stored in the memory. The instructions may be executable by the processor to cause the apparatus to identify an activation of a periodic reception mode, monitor, based on identifying the activation of the periodic reception mode, a control channel in accordance with a periodic schedule associated with the periodic reception mode, and sleep, based on identifying the activation of the periodic reception mode, in accordance with the periodic schedule associated with the periodic reception mode.

Another apparatus for wireless communication is described. The apparatus may include means for identifying an activation of a periodic reception mode, monitoring, based on identifying the activation of the periodic reception mode, a control channel in accordance with a periodic schedule associated with the periodic reception mode, and sleeping, based on identifying the activation of the periodic reception mode, in accordance with the periodic schedule associated with the periodic reception mode.

A non-transitory computer-readable medium storing code for wireless communication is described. The code may include instructions executable by a processor to identify an activation of a periodic reception mode, monitor, based on identifying the activation of the periodic reception mode, a control channel in accordance with a periodic schedule associated with the periodic reception mode, and sleep, based on identifying the activation of the periodic reception mode, in accordance with the periodic schedule associated with the periodic reception mode.

Some examples of the method, apparatuses, and non-transitory computer-readable medium described herein may further include operations, features, means, or instructions for receiving an indication of the periodic schedule associated with the periodic reception mode, and determining a duration of scheduling intervals for the periodic reception mode based on the received indication, where monitoring the control channel in accordance with the periodic schedule includes monitoring the control channel during the scheduling intervals.

In some examples of the method, apparatuses, and non-transitory computer-readable medium described herein, the duration of the scheduling intervals may be based on a scheduling load at a base station.

Some examples of the method, apparatuses, and non-transitory computer-readable medium described herein may further include operations, features, means, or instructions for determining a duration of scheduling cycles for the periodic reception mode based on the received indication, where a scheduling cycle includes a respective scheduling interval, and where sleeping in accordance with the periodic schedule includes sleeping during a portion of the scheduling cycle outside the respective scheduling interval.

Some examples of the method, apparatuses, and non-transitory computer-readable medium described herein may further include operations, features, means, or instructions for determining a recommended value of a parameter associated with the periodic schedule, and transmitting, to a base station, the recommended value of the parameter associated with the periodic schedule.

In some examples of the method, apparatuses, and non-transitory computer-readable medium described herein, the recommended value of the parameter includes a recommended duration of scheduling intervals for the periodic reception mode, a recommended duration of scheduling cycles for the periodic reception mode, a recommended duration of a periodic reception inactivity timer for the periodic reception mode, or any combination thereof.

Some examples of the method, apparatuses, and non-transitory computer-readable medium described herein may further include operations, features, means, or instructions for receiving, from a base station, an indication of a duration of scheduling intervals for monitoring the control channel while in the periodic reception mode, where scheduling intervals may be subsets of scheduling cycles for the periodic reception mode, and determining a recommended duration of scheduling cycles based on the duration of scheduling intervals, a throughput of a wireless link associated with the base station, a rate of data arrival, a latency tolerance for an application associated with the data, or any combination thereof.

In some examples of the method, apparatuses, and non-transitory computer-readable medium described herein, determining the recommended duration of scheduling cycles may include operations, features, means, or instructions for determining the recommended duration of scheduling cycles based on a ratio between the throughput of the wireless link and the rate of data arrival.

Some examples of the method, apparatuses, and non-transitory computer-readable medium described herein may further include operations, features, means, or instructions for determining the recommended duration of scheduling cycles based on multiplying the duration of scheduling intervals by the ratio.

Some examples of the method, apparatuses, and non-transitory computer-readable medium described herein may further include operations, features, means, or instructions for determining that the recommended duration of scheduling cycles may be less than the latency tolerance, and transmitting, to the base station, a request for increased bandwidth based on the recommended duration of scheduling cycles being less than the latency tolerance.

Some examples of the method, apparatuses, and non-transitory computer-readable medium described herein may further include operations, features, means, or instructions for determining that the recommended duration of scheduling cycles may be greater than the latency tolerance, and transmitting, to the base station, a request for reduced bandwidth based on the recommended duration of scheduling cycles being greater than the latency tolerance.

In some examples of the method, apparatuses, and non-transitory computer-readable medium described herein, identifying the activation of the periodic reception mode may include operations, features, means, or instructions for receiving an activation signal for the periodic reception mode.

In some examples of the method, apparatuses, and non-transitory computer-readable medium described herein, receiving the activation signal may include operations, features, means, or instructions for receiving a medium access control (MAC) layer control element indicating activation of the periodic reception mode, the MAC layer control element indicating one or more parameter values associated with the periodic schedule.

In some examples of the method, apparatuses, and non-transitory computer-readable medium described herein, receiving the activation signal may include operations, features, means, or instructions for receiving a downlink control information (DCI) indicating activation of the periodic reception mode, the DCI indicating one or more parameter values associated with the periodic schedule.

In some examples of the method, apparatuses, and non-transitory computer-readable medium described herein, receiving the activation signal may include operations, features, means, or instructions for receiving a radio resource control (RRC) configuration message that indicates one or more parameter values associated with the periodic schedule.

Some examples of the method, apparatuses, and non-transitory computer-readable medium described herein may further include operations, features, means, or instructions for initializing a periodic reception inactivity timer based on identifying the activation of the periodic reception mode.

Some examples of the method, apparatuses, and non-transitory computer-readable medium described herein may further include operations, features, means, or instructions for receiving data while monitoring the control channel in accordance with the periodic schedule, and restarting the periodic reception inactivity timer after receiving the data.

Some examples of the method, apparatuses, and non-transitory computer-readable medium described herein may further include operations, features, means, or instructions for determining an expiration of the periodic reception inactivity timer, and resuming a continuous monitoring mode based on the expiration of the periodic reception inactivity timer.

Some examples of the method, apparatuses, and non-transitory computer-readable medium described herein may further include operations, features, means, or instructions for determining an expiration of the periodic reception inactivity timer, and switching from the periodic reception mode to a discontinuous reception (DRX) mode based on the expiration of the periodic reception inactivity timer.

Some examples of the method, apparatuses, and non-transitory computer-readable medium described herein may further include operations, features, means, or instructions for receiving a MAC layer control element indicating deactivation of the periodic reception mode.

Some examples of the method, apparatuses, and non-transitory computer-readable medium described herein may further include operations, features, means, or instructions for receiving from a base station, a wake up signal before a scheduling interval indicating a presence of data for the UE, where monitoring the control channel in accordance with the periodic schedule may be based on the wake up signal.

Some examples of the method, apparatuses, and non-transitory computer-readable medium described herein may further include operations, features, means, or instructions for transmitting a scheduling request during a first scheduling interval of the periodic reception mode, the scheduling request including a request to schedule uplink transmission during the first scheduling interval or during a second scheduling interval of the periodic reception mode that may be after the first scheduling interval.

Some examples of the method, apparatuses, and non-transitory computer-readable medium described herein may further include operations, features, means, or instructions for receiving an indication of a hybrid automatic repeat request (HARQ) configuration for the periodic reception mode, identifying a HARQ transmission associated with a scheduling interval of the periodic reception mode, and communicating with a base station based on the HARQ configuration for the periodic reception mode, where communicating based on the HARQ configuration includes at least one of extending the scheduling interval to accommodate the HARQ transmission or exchanging the HARQ transmission with the base station during a subsequent scheduling interval.

In some examples of the method, apparatuses, and non-transitory computer-readable medium described herein, identifying the activation of the periodic reception mode may include operations, features, means, or instructions for identifying the indication of the HARQ configuration for the periodic reception mode.

A method of wireless communication is described. The method may include identifying, for a UE, an activation of a periodic reception mode, aggregating, based on the activation of the periodic reception mode, a set of packets for the UE to create a combined transmission, the set of packets including at least a first packet and a second packet received after the first packet, and transmitting the combined transmission to the UE in accordance with a periodic schedule associated with the periodic reception mode.

An apparatus for wireless communication is described. The apparatus may include a processor, memory in electronic communication with the processor, and instructions stored in the memory. The instructions may be executable by the processor to cause the apparatus to identify, for a UE, an activation of a periodic reception mode, aggregate, based on the activation of the periodic reception mode, a set of packets for the UE to create a combined transmission, the set of packets including at least a first packet and a second packet received after the first packet, and transmit the combined transmission to the UE in accordance with a periodic schedule associated with the periodic reception mode.

Another apparatus for wireless communication is described. The apparatus may include means for identifying, for a UE, an activation of a periodic reception mode, aggregating, based on the activation of the periodic reception mode, a set of packets for the UE to create a combined transmission, the set of packets including at least a first packet and a second packet received after the first packet, and transmitting the combined transmission to the UE in accordance with a periodic schedule associated with the periodic reception mode.

A non-transitory computer-readable medium storing code for wireless communication is described. The code may include instructions executable by a processor to identify, for a UE, an activation of a periodic reception mode, aggregate, based on the activation of the periodic reception mode, a set of packets for the UE to create a combined transmission, the set of packets including at least a first packet and a second packet received after the first packet, and transmit the combined transmission to the UE in accordance with a periodic schedule associated with the periodic reception mode.

Some examples of the method, apparatuses, and non-transitory computer-readable medium described herein may further include operations, features, means, or instructions for determining that a rate of data arrival for the UE may be less than a throughput of a wireless link associated with the UE, where aggregating the set of packets may be based on the rate of data arrival for the UE being less than the throughput of the wireless link associated with the UE.

Some examples of the method, apparatuses, and non-transitory computer-readable medium described herein may further include operations, features, means, or instructions for buffering the first packet of the set for a duration of time based on the periodic schedule.

Some examples of the method, apparatuses, and non-transitory computer-readable medium described herein may further include operations, features, means, or instructions for determining a duration of scheduling intervals for the periodic reception mode based on a scheduling load, and transmitting an indication of the determined duration of the scheduling intervals to the UE, where transmitting the combined transmission to the UE in accordance with the periodic schedule includes transmitting the combined transmission to the UE during a scheduling interval.

Some examples of the method, apparatuses, and non-transitory computer-readable medium described herein may further include operations, features, means, or instructions for transmitting an indication of a duration of scheduling cycles for the periodic reception mode, where a scheduling cycle includes a respective scheduling interval, and configuring the UE to sleep during a portion of the scheduling cycle outside the respective scheduling interval.

Some examples of the method, apparatuses, and non-transitory computer-readable medium described herein may further include operations, features, means, or instructions for receiving, from the UE, a recommended value of a parameter associated with the periodic schedule, the recommended value of the parameter including a recommended duration of scheduling intervals for the periodic reception mode, a recommended duration of scheduling cycles for the periodic reception mode, a recommended duration of an inactivity timer for the periodic reception mode, or any combination thereof, and determining a value of the parameter associated with the periodic schedule based on the recommended value.

Some examples of the method, apparatuses, and non-transitory computer-readable medium described herein may further include operations, features, means, or instructions for transmitting, to the UE, an indication of a duration of scheduling intervals for the periodic reception mode, where scheduling intervals may be subsets of scheduling cycles for the periodic reception mode, and receiving from the UE, an indication of a recommended duration of scheduling cycles, the recommended duration of scheduling cycles based on a wireless throughput associated with the UE, a rate of data arrival for the UE, a latency tolerance for an application associated with the data, or any combination thereof.

Some examples of the method, apparatuses, and non-transitory computer-readable medium described herein may further include operations, features, means, or instructions for receiving, from the UE, a request for increased bandwidth based on the recommended duration of scheduling cycles being less than the latency tolerance.

Some examples of the method, apparatuses, and non-transitory computer-readable medium described herein may further include operations, features, means, or instructions for receiving, from the UE, a request for reduced bandwidth based on the recommended duration of scheduling cycles being greater than the latency tolerance.

In some examples of the method, apparatuses, and non-transitory computer-readable medium described herein, aggregating the set of packets to create the combined transmission may include operations, features, means, or instructions for forming a single packet based on the set of packets, where the combined transmission includes the single packet.

In some examples of the method, apparatuses, and non-transitory computer-readable medium described herein, aggregating the set of packets to create the combined transmission may include operations, features, means, or instructions for forming a burst of packets based on the set of packets, where the combined transmission includes the burst of packets.

Some examples of the method, apparatuses, and non-transitory computer-readable medium described herein may further include operations, features, means, or instructions for transmitting, to the UE, an activation signal for the periodic schedule.

In some examples of the method, apparatuses, and non-transitory computer-readable medium described herein, transmitting the activation signal may include operations, features, means, or instructions for transmitting, to the UE, a MAC layer control element indicating activation of the periodic reception mode, the MAC layer control element indicating one or more parameter values associated with the periodic schedule.

In some examples of the method, apparatuses, and non-transitory computer-readable medium described herein, transmitting the activation signal may include operations, features, means, or instructions for transmitting, to the UE, a DCI indicating activation of the periodic reception mode, the DCI indicating one or more parameter values associated with the periodic schedule.

In some examples of the method, apparatuses, and non-transitory computer-readable medium described herein, transmitting the activation signal may include operations, features, means, or instructions for transmitting, to the UE, an RRC configuration message that indicates one or more parameter values associated with the periodic schedule.

Some examples of the method, apparatuses, and non-transitory computer-readable medium described herein may further include operations, features, means, or instructions for transmitting, to the UE, a MAC layer control element indicating deactivation of the periodic reception mode.

Some examples of the method, apparatuses, and non-transitory computer-readable medium described herein may further include operations, features, means, or instructions for transmitting, to the UE, a wake up signal indicating a presence of data for the UE, where transmitting the combined transmission in accordance with the periodic schedule may be based on the wake up signal.

Some examples of the method, apparatuses, and non-transitory computer-readable medium described herein may further include operations, features, means, or instructions for receiving, from the UE, a scheduling request during a first scheduling interval of the periodic reception mode, the scheduling request including a request to schedule uplink transmission during the first scheduling interval or during a second scheduling interval of the periodic reception mode that may be after the first scheduling interval.

DETAILED DESCRIPTION

Figure 1:
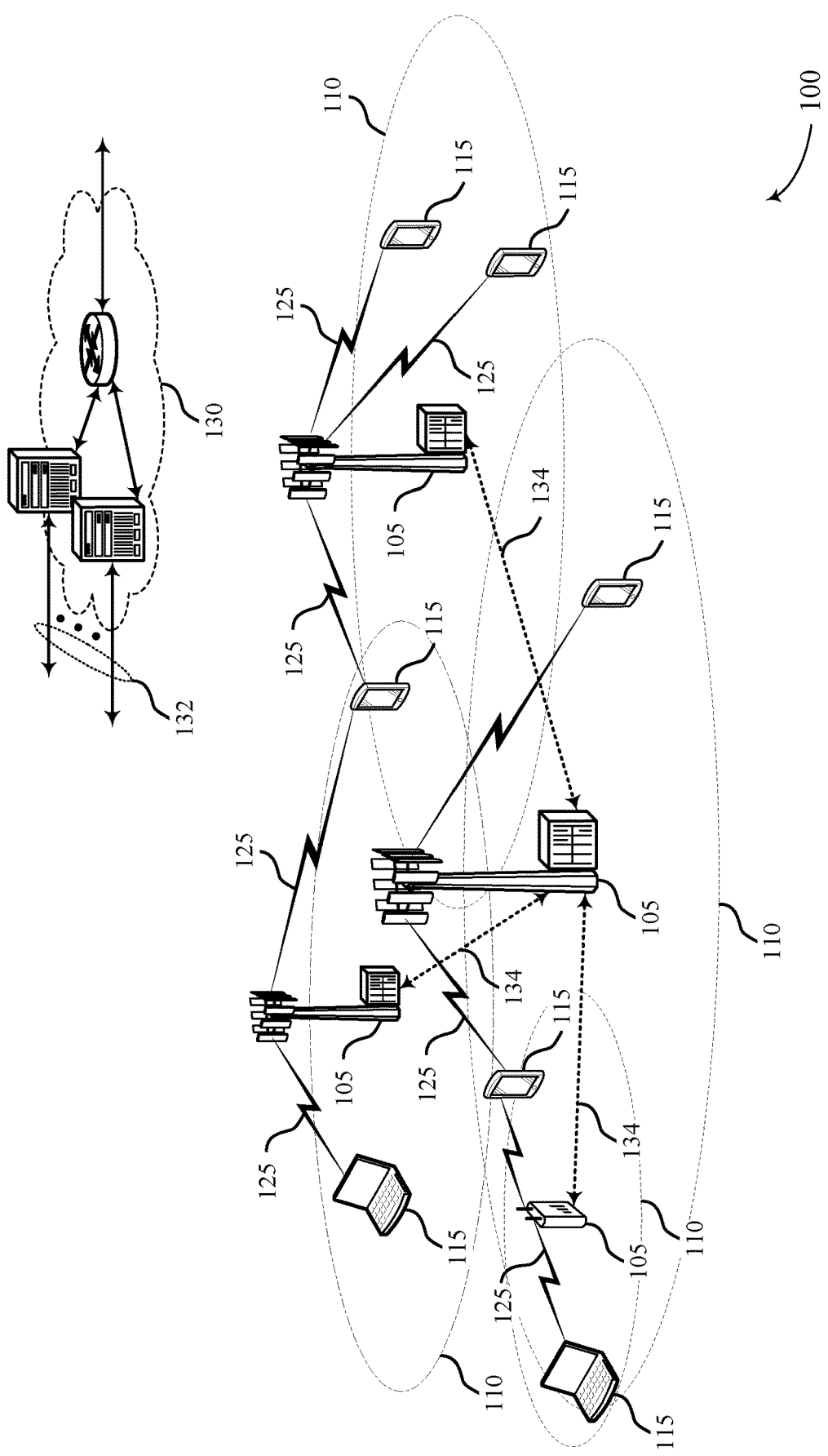
FIG. 1 illustrates an example of a system for wireless communications that supports a periodic reception mode for wireless communications in accordance with aspects of the present disclosure.

In some wireless communications systems (e.g., millimeter wave (mmW) systems), an arrival rate of data at a base station may not depend on the throughput supported by a wireless link between the base station and a UE. For example, the arrival rate of data for a UE may not vary in response to changes to the throughput of the wireless link. As one example, a server or other component of a network of a streaming service, may artificially limit (such as, throttle) a data rate for the UE such that the rate at which data for the UE arrives at the base station may be static (e.g., capped) even if the throughput of the wireless link between the base station and the UE increases. Such data for the UE may be referred to as inelastic (e.g., inelastic traffic or inelastic data).

As described herein, to reduce the power consumption at a UE associated with repeatedly monitoring scheduled on-durations, the base station may determine that data traffic for the UE is inelastic and activate a periodic reception mode at the UE. In some cases, the periodic reception mode may be based on a latency tolerance of the UE (e.g., of the application at the UE associated with the inelastic data) and a throughput of the wireless link associated with the UE. That is, the base station may determine that a rate of data arrival does not change with the throughput of the wireless link associated with the UE. In such a case, where the data traffic for the UE is delay tolerant, the base station may combine multiple packets, and may transmit the combined transmission as a data burst. Thus, the base station may compress traffic for the UE into fewer data bursts with an increased time gap between them, which may allow the UE to conserve power by sleeping during the increased time gap while maintaining or at least substantially maintaining the overall (e.g., average) data rate with which the UE receives the inelastic data traffic.

In a periodic reception mode, the base station may initiate the periodic reception mode by transmitting an activation signal. In some cases, the activation signal may indicate durations and periodicities of an active state (such as data transmission and/or reception period). Additionally, or alternatively, the activation signal may indicate durations and periodicities of an inactive state (such as a low power period) for the UE. In some cases, the UE may transition between an active state for data transmission and reception and an inactive state (such as "sleep" state) for power conservation. The UE may be configured with or otherwise identify the active durations (such as the durations when the UE is in an active state) that include data or control information from the base station. In some cases, the UE may identify the active durations based on the activation signal received from the base station. Accordingly, the UE may monitor these identified active durations for the data. In some cases, the UE may avoid monitoring the inactive durations in order to decrease power consumption.

Aspects of the disclosure are initially described in the context of a wireless communications system. Aspects of the disclosure are further illustrated by and described with reference to diagrams, and flowcharts that relate to periodic reception mode for wireless communications.

FIG. 1 illustrates an example of a wireless communications system 100 that supports a periodic reception mode for wireless communications in accordance with aspects of the present disclosure. The wireless communications system 100 includes base stations 105, UEs 115, and a core network 130. In some examples, the wireless communications system 100 may be an LTE network, an LTE-A network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation NodeB or giga-NodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that may be capable of tolerating interference from other users.

Wireless communications system 100 may also operate in an extremely high frequency (EHF) region of the spectrum (e.g., from 30 GHz to 300 GHz), also known as the millimeter band. In some examples, wireless communications system 100 may support mmW communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a carrier aggregation configuration in conjunction with component carriers operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving device is equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g., synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in different beam directions. For example, a UE 115 may receive one or more of the signals transmitted by the base station 105 in different directions, and the UE 115 may report to the base station 105 an indication of the received signal with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples, a receiving device may use a single receive beam to receive along a single beam direction (e.g., when receiving a data signal). The single receive beam may be aligned in a beam direction determined based on listening according to different receive beam directions (e.g., a beam direction determined to have a highest signal strength, highest signal-to-noise ratio, or otherwise acceptable signal quality based on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A MAC layer may perform priority handling and multiplexing of logical channels into transport channels. The MAC layer may also use HARQ to provide retransmission at the MAC layer to improve link efficiency. In the control plane, the RRC protocol layer may provide establishment, configuration, and maintenance of an RRC connection between a UE 115 and a base station 105 or core network 130 supporting radio bearers for user plane data. At the Physical layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200\ T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100 and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an evolved universal terrestrial radio access (E-UTRA) absolute radio frequency channel number (EARFCN)) and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)).

The organizational structure of the carriers may be different for different radio access technologies (e.g., LTE, LTE-A, LTE-A Pro, NR). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may include one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth or may be configurable to support communications over one of a set of carrier bandwidths. In some examples, the wireless communications system 100 may include base stations 105 and/or UEs 115 that support simultaneous communications via carriers associated with more than one different carrier bandwidth.

Wireless communications system 100 may support communication with a UE 115 on multiple cells or carriers, a feature which may be referred to as carrier aggregation or multi-carrier operation. A UE 115 may be configured with multiple downlink component carriers and one or more uplink component carriers according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other component carriers, which may include use of a reduced symbol duration as compared with symbol durations of the other component carriers. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may include one or multiple symbol periods. In some cases, the TTI duration (that is, the number of symbol periods in a TTI) may be variable.

Wireless communications system 100 may be an NR system that may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across the frequency domain) and horizontal (e.g., across the time domain) sharing of resources.

Some wireless communications systems may support UEs operating in a DRX mode. The UE may transition between an active state for data transmission and reception and an inactive state, for power conservation. The DRX mode of operation may be configured by the network according to a DRX cycle (or value). Conventional wireless communications systems, whether as part of a DRX mode or otherwise, may not account for inelastic data traffic between the UE 115 and the base station 105.

Thus, as described herein, to reduce the power consumption at the UE 115, the base station 105 may activate a periodic reception mode at the UE 115. In some cases, the periodic reception mode may be based on a latency tolerance of the UE 115 and a throughput of the wireless link associated with the UE 115. In a periodic reception mode, a UE 115 may transition between an active state for data transmission and reception and an inactive state (such as idle state or "sleep" state). The active state may be referred to as a scheduling interval in a periodic reception mode. The scheduling interval may be included in a scheduling cycle. In some cases, a remaining duration of the scheduling cycle may be referred to as an idle state. The UE 115 may determine if data is available by monitoring a control channel, such as a PDCCH during the scheduling interval. The PDCCH may carry or otherwise convey an indication that a base station 105 has data ready to transmit to the UE 115 or is scheduling the UE 115 for data transmission. In some cases, the UEs 115 may transition to an idle mode, at the completion of the scheduling interval. Due to the high throughput of the wireless link associated with the UE 115, the base station 105 may determine that more packet one data packet may be transmitted to the UE 115 during a scheduling interval. That is, the base station 105 may combine multiple packets, and may transmit the combined transmission as a data burst. Thus, the UE 115 may sleep for longer periods of inactivity and may receive combined data packets during the scheduling intervals.

Figure 2:
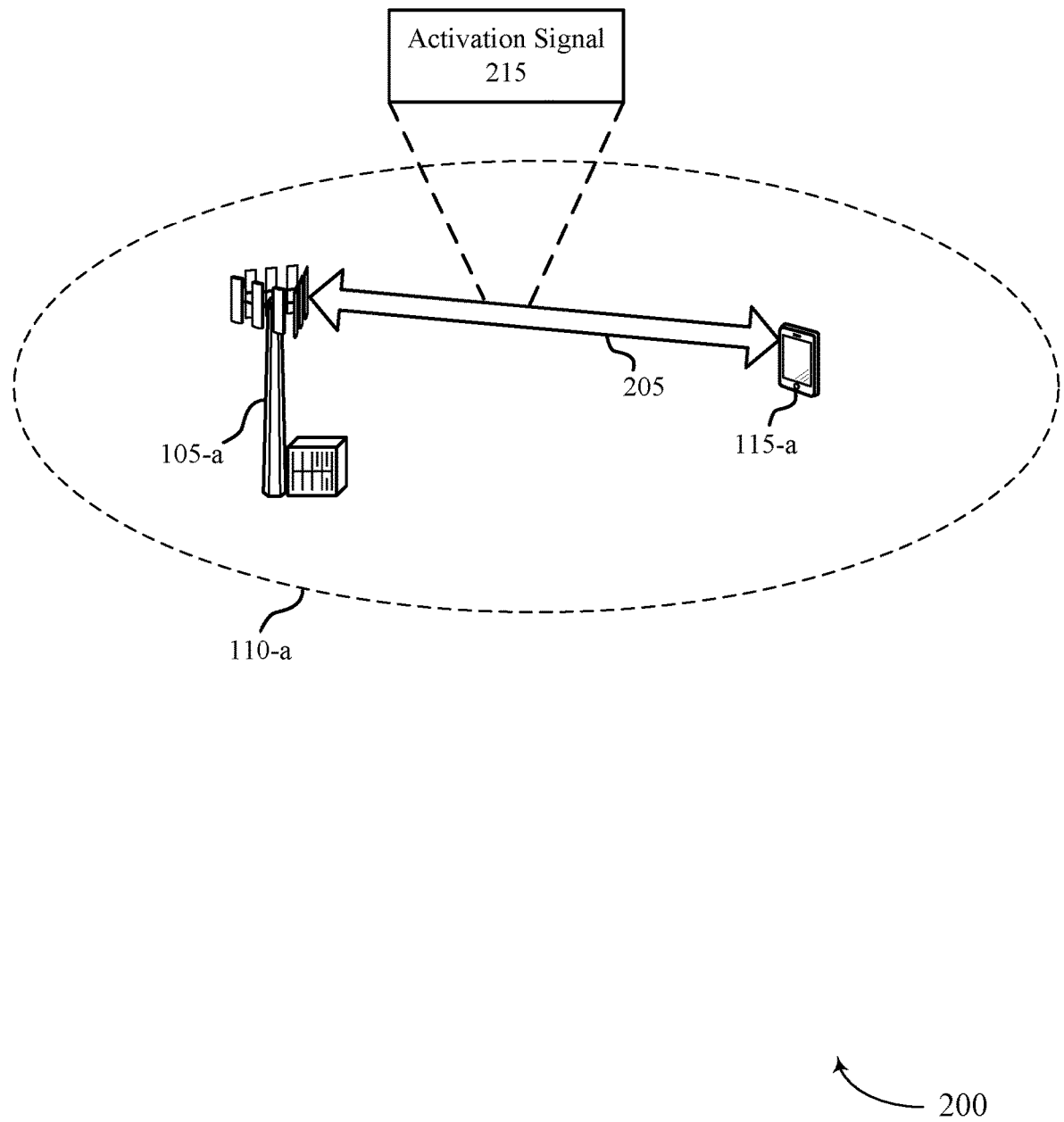
FIG. 2 illustrates an example of a wireless communication system that supports a periodic reception mode for wireless communications in accordance with aspects of the present disclosure.

FIG. 2 illustrates an example of a wireless communications system 200 that supports a periodic reception mode for wireless communications in accordance with aspects of the present disclosure. In some examples, the wireless communications system 200 may be an example of a wireless communications system 100 and may contain a base station 105-a and a UE 115-a, which may be examples of the corresponding wireless devices described with reference to FIG. 1. The base station 105-a may provide network coverage for the UE 115 within geographic coverage area 110-a. In some cases, the UE 115-a may support a periodic reception mode for improved power efficiency. According to some instances, the UE 115-a may identify an activation of a periodic reception mode. For example, a UE 115-a may receive an activation signal 215 which may indicate a periodic schedule to the UE 115-a. The UE 115 may be configured to monitor a control channel and sleep in accordance with the periodic schedule.

In some cases, data traffic may be inelastic. In other words, a rate of data arrival may not change with throughput of a wireless link. In conventional systems, base stations may not account for the throughput of a wireless link. That is, a rate at which the base station schedules data transmission for a UE may not change with the throughput of the wireless link between the base station and the UE. However, in a mmW system, a speed of a wireless link may be greater than a rate of data arrival. This may lead to a waste of bandwidth of the wireless link.

In conventional wireless communications system, a DRX mode of operation may span the time period between consecutive "ON" states. A UE may determine if data is available by monitoring a control channel, such as a PDCCH. The PDCCH may carry or otherwise convey an indication that a base station has data ready to transmit to the UE. Each indication of data arrival may restart a DRX inactivity timer at the UE, which may reduce an amount of time the UE sleeps between two data receiving windows. A DRX operating mode may not, however, be flexible to take advantage of inelasticity in data traffic.

According to one or more aspects of the present disclosure, the base station 105-*a* may be capable of activating a periodic reception mode. In some cases, to reduce the frequency of the control channel monitoring, a base station (such as base station 105-*a*) may be configured to buffer data, send transmit data in a burst. This may result in an increase in the gaps between data arrival windows at a UE (such as UE 115-*a*). The increase in the gaps between data arrival windows may increase power saving opportunities for the UE 115-*a*. For example, the base station 105-*a* may determine that a throughput of a wireless link is greater than a threshold, and may activate the periodic reception mode at the UE 115-*a*. The base station 105-*a* may then transmit an activation signal 215 to the UE 115-*a*. For example, base station 105-*a* may transmit the activation signal 215 on a downlink channel 205 (e.g., a downlink control channel). In some cases, the base station 105-*a* may aggregate multiple data packets prior to transmitting them to the UE 115-*a*. For example, the base station 105-*a* may aggregate a first packet and a second packet received after the first packet. In some cases, the base station 105-*a* may form a single packet based on the plurality of packets, where the combined transmission includes the single packet. In some cases, the base station 105-*a* may form a burst of packets based on the plurality of packets, where the combined transmission includes the burst of packets. The base station 105-*a* may then transmit the combined transmission to the UE 115-*a*.

In the wireless communications system 200 (e.g., an mmW system), the UE 115-*a* may receive an activation signal from the base station 105-*a* and may determine an activation of the periodic reception mode. The UE 115-*a* may then be configured to determine a periodic schedule associated with the periodic reception mode. The periodic schedule may include a duration of scheduling interval and a duration of a scheduling cycle for the periodic reception mode. The UE 115-*a* may be configured to monitor, a control channel in accordance with a periodic schedule associated with the periodic reception mode. In some cases, the UE 115-*a* may monitor a control channel during the scheduling interval. For example, the UE 115-*a* may monitor the control channel for PDCCH reception during the scheduling interval. Additionally, the UE 115-*a* may be configured to sleep, in accordance with the periodic schedule associated with the periodic reception mode. For example, the UE 115-*a* may transition into a low power mode during a portion of the scheduling cycle.

To take advantage of the high throughput of wireless link between the base station 105-*a* and the UE 115-*a* within a cell (e.g., the geographic coverage area 110-*a*), the base station 105-*a* may activate a periodic reception mode at the UE 115-*a*. Base station 105-*a* may multiplex multiple data packets such that the available resources are efficiently used to support wireless communications with minimal power penalties.

Figure 3:
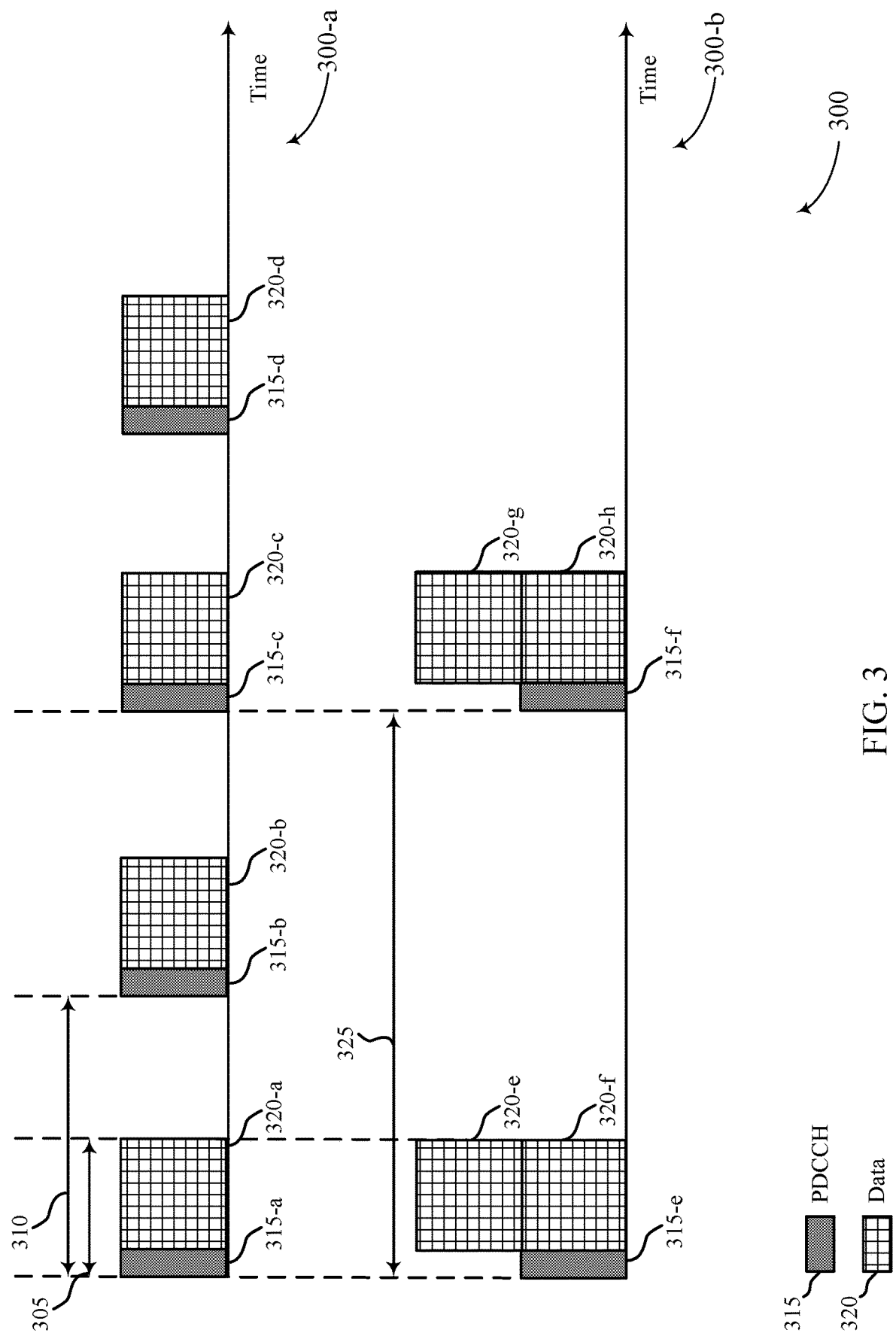
FIG. 3 illustrates an example of a timing diagram that supports a periodic reception mode for wireless communications in accordance with aspects of the present disclosure.

FIG. 3 illustrates an example of a timing diagram 300 that supports a periodic reception mode for wireless communications in accordance with aspects of the present disclosure. In some examples, the timing diagram 300 may implement aspects of wireless communications system 100. The timing diagram 300 may correspond to functionality performed by a UE 115 described with reference to FIGS. 1 and 2.

The UE 115 may utilize periodic reception mode for wireless communications to achieve power savings during periods of traffic inactivity based on a delay requirement of the UE 115. In some cases, the timing diagram 300 corresponds to UE operations in a legacy wireless communications systems. For further power savings in a wireless communications system 100 or 200, a base station 105 may aggregate data packets and transmit the aggregated data packets as periodic bursts.

A UE 115 (such as UE described with reference to FIGS. 1 and 2) may support delay-tolerant data traffic. The UE 115 may operate in a number of different modes to support transmission and reception of data while achieving power savings. For example, in an active duration (such as duration for monitoring data), a UE 115 may operate in a high or standard power mode (e.g., as compared to a low power mode or a "sleep" mode of the UE 115). In some cases, the UE 115 may be configured to receive an activation signal from a base station 105 and identify a periodic schedule from the activation signal. The UE 115 may then switch between monitoring a channel and sleeping, in accordance with the identified periodic schedule.

The timing diagram 300-*a* may illustrate a data transmission timeline in conventional systems, and the timing diagram 300-*b* may illustrate a data transmission timeline according to one or more aspects of the present disclosure. In existing wireless communications systems, a base station may periodically transmit control channel signaling (such as PDCCH 315-*a*, 315-*b*, 315-*c*, or 315-*d*) and data packet or data 320 (such as 320-*a*, 320-*b*, 320-*c*, or 320-*d*). During an active duration 305, the UE 115 may receive downlink signals from the base station 105. For example, during the active duration 305, the UE 115 may receive downlink data 320-*a* from a base station 105. In some cases, the UE 115 may transmit uplink data to the base station 105 or perform any additional operations. In some cases, the UE 115 may detect a PDCCH 315-*a* signaling prior to receiving the data 320-*a* from the base station 105. After receipt of the data 320-*a*, the UE 115 may remain in an inactive period 310 following the active duration 305. According to one or more aspects, the UE 115 may initiate an inactivity timer at the start of the inactive period 310 (i.e., the end of the active duration 305). During this inactive period 310, if the UE 115 receives additional signals (e.g., PDCCH signals) or transmits additional signals before expiration of the inactivity timer, the UE 115 may re-enter an additional active duration 305 and may reset the inactivity timer to restart at the end of this additional active duration 305. Otherwise, if the inactivity timer expires, the UE 115 may ramp-down its power and enter a low power mode or "sleep" mode (e.g., a UE "OFF" duration). During an OFF duration, the UE 115 may not transmit or receive signals.

Based on configured DRX cycles, the UE 115 may periodically or aperiodically wake up from the low power mode into an ON duration. During the ON duration, the UE 115 may monitor the PDCCH 315 for any signaling transmitted to the UE 115. If the UE 115 does not detect any PDCCH signaling for the UE 115, the UE 115 may return to an OFF duration (i.e., go back to sleep) for the remainder of the DRX cycle following the ON duration with no PDCCH detected. The UE 115 may then wake up for the next ON duration and repeat the PDCCH monitoring. The length of time between each ON duration may stay the same or change based on one or more timers.

The timing diagram 300-*b* may illustrate a data transmission timeline for a UE 115 that supports a periodic reception mode for inelastic and delay-tolerant data traffic. According to one or more aspects of the present disclosure, the base station 105 may aggregate a number of data packets to create a combined transmission. The base station 105 may then transmit the combined transmission to the UE 115. As described in FIG. 3, the base station may periodically transmit a control channel signaling (such as PDCCH 315-e) and data 320. To achieve additional power savings, the base station 105 may aggregate a first data 320-e and a second data 320-f. In some cases, the first data 320-e may arrive at an earlier time than the second data 320-f. That is, if the base station 105 determines that the arriving data traffic is inelastic and that the UE 115 is delay-tolerant, the base station 105 may be configured to aggregate the data packets in order to create additional opportunities for power saving at the UE 115. In some cases, the base station 105 may form a single packet based on the plurality of packets, where the combined transmission includes the single packet. In some cases, the base station 105 may form a burst of packets based on the plurality of packets, where the combined transmission includes the burst of packets. In some cases, the base station 105 may not buffer data traffic longer than the latency tolerance at the UE 115.

During an active duration 305, the UE 115 may receive downlink signals from the base station 105. For example, during an active duration 305, the UE 115 may receive a PDCCH 315-e indicating an arrival of data at the UE 115. The UE 115 may then receive an aggregated downlink data 320-e and 320-f from the base station 105. As one example, the base station 105-a may receive data packets every 5 ms. The base station 105 may determine that a latency tolerance at the UE 115 is 10 ms. In such a case, the base station 105 may determine to aggregate the data packets in a burst and transmit the data bursts every 10 ms instead of every 5 ms. In some cases, after receipt of the aggregated data 320-e and 320-f, the UE 115 may remain in an inactive period 325 following the active duration 305. As previously discussed, since the base station 105 aggregates multiple packets, the gap between receiving a PDCCH 315-e and the following PDCCH 315-f is greater than conventional wireless communications systems. In some cases, the UE 115 may initiate an inactivity timer at the start of the inactive period 325 (i.e., the end of the active duration 305). Since a duration of the inactive period 325 is greater than a duration of the inactive period 310, the UE 115 may achieve power savings by remaining in a low-power mode or "sleep" mode for a longer duration. In the example of FIG. 3, the base station 105 aggregates two sets of data 320-e and 320-f, and the gap between receiving a PDCCH 315-e and the following PDCCH 315-f is twice the gap between receiving a PDCCH 315-a and a following PDCCH 315-b in conventional wireless communications systems. Thus, according to one or more aspects of the present disclosure, the UE 115 may be configured to ramp down its power for a duration twice as long as the duration of convention wireless communications systems. In this way, during a longer period of traffic inactivity, the UE 115 may switch to low-power mode to achieve significant power savings.

Figure 4:
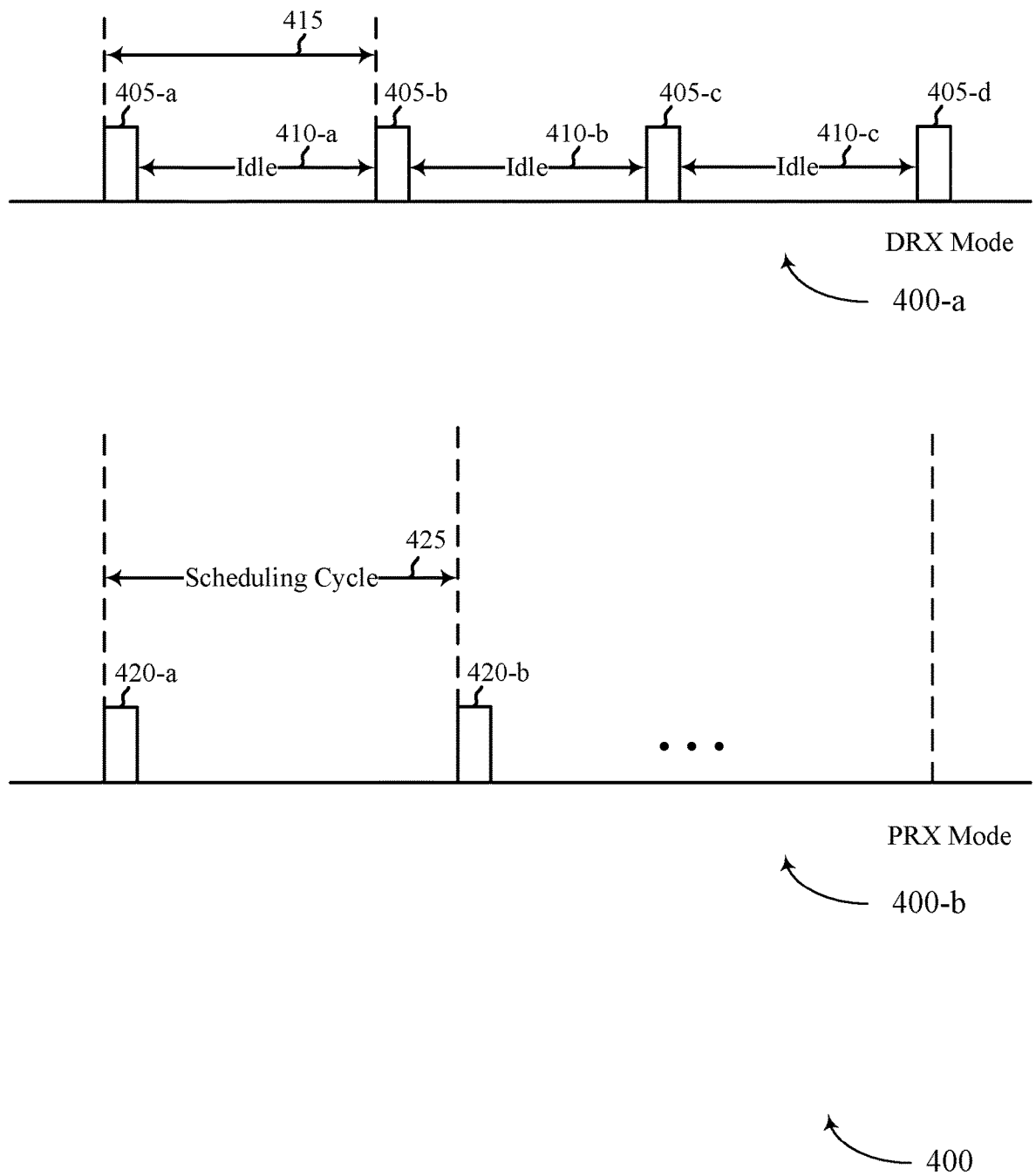
FIG. 4 illustrates an example of a timing diagram that supports a periodic reception mode for wireless communications in accordance with aspects of the present disclosure.

FIG. 4 illustrates an example of a timing diagram 400 that supports a periodic reception mode for wireless communications in accordance with aspects of the present disclosure. In some examples, timing diagram 400 may include a first timing diagram 400-a and a second timing diagram 400-b. In some cases, the first timing diagram 400-a and the second timing diagram 400-b may implement aspects of wireless communications system 100. Aspects of timing diagram 400 may be implemented by a UE and/or base station, which may be examples of the corresponding device described herein. Broadly, the first timing diagram 400-a illustrates one example of a system supporting DRX mode operations and the second timing diagram 400-b illustrates one example of a system supporting periodic reception mode for wireless communications.

Generally, timing diagram 400-a illustrates a timing diagram associated with a default DRX value indicated by a base station 105 (such as base station described with reference to FIGS. 1, 2, and 3). The default DRX value may be a network configured DRX value that is transmitted by base stations of the network in broadcast messages. The broadcast messages may include any combination of master information block (MIB) messages, system information block (SIB) messages, synchronization signals such as primary synchronization signal (PSS) and/or secondary synchronization signal (SSS), or any other message transmitted by the network. In some cases, the DRX value may be indicated to a UE 115 (such as UE described with reference to FIGS. 1, 2, and 3) during an RRC connection procedure.

According to the timing diagram 400-a, the default DRX value timing diagram may be associated with a DRX mode that include transitions to an active state or "ON" state 405 (such as 405-a, 405-b, 405-c, and 405-d) where a UE 115 monitors for paging messages from the base station 105, followed by an inactive state or idle state 410 (such as 410-a, 410-b, and 410-c) where the UE may ramp down the power level. In some examples, the UE 115 may be configured to shut down various circuitry, functions, and/or processes during the idle state 410, to conserve power. The DRX mode of operation may have an associated default DRX value (also referred to as a DRX cycle 415). In some cases, the DRX cycle may be associated with how often the UE 115 transitions to the active state 405 (or "ON" state 405). For example, the default DRX value may be measured between subsequent instances of the active states 405 (such as between "ON" state 405-a and 405-b) or between subsequent instances of the idle state 410 (such as between idle state 410-a and 410-b). In some cases, the default DRX value or the DRX cycle 415 may be configured by the network and indicated in broadcast messages. The DRX mode of operation illustrated in timing diagram 400-a may not account for inelastic traffic and throughput of the wireless link between the UE 115 and the base station 105, a UE 115 may have to transition between active state 405 and idle state 410, when there is a new data arrival. Each instance of the UE 115 transitioning between an idle state 410 to an active state 405 and then back to the idle state 410 may have incur an additional power usage at the UE.

According to one or more aspects of the present disclosure, the timing diagram 400-b illustrates a timing diagram associated with a periodic reception mode for wireless communications. In some cases, the periodic reception mode may be according to a periodic schedule indicated by a base station. In some cases, the periodic schedule may indicate durations of active states, inactive states, and inactivity timers. According to the example of FIG. 4, the timing diagram 400-b may be associated with a periodic reception mode that include transitions to an active state 420 (such as 420-a and 420-b) where a UE 115 monitors for paging messages from the base station, followed by idle state where the UE ramps down the power level.

In some cases, the active state 420 in the periodic schedule may be referred to as a scheduling interval 420, and the inactive state in the periodic schedule may be referred to as a portion of a scheduling cycle 425. In some cases, the scheduling cycle 425 may be associated with how often the UE 115 transitions to the active state 420. For example, the scheduling cycle 425 may be measured between subsequent instances of the scheduling intervals 420 or active states (such as between a first scheduling interval 420-*a* and a second scheduling interval 420-*b*) or between subsequent instances of the inactive states or scheduling cycles 425 (not shown). In some cases, the scheduling interval 420 may be a portion of the scheduling cycle 425. For example, the UE 115 may be configured to monitor for PDCCH resources during a scheduling interval 420 and may transition to a "sleep" mode during the remaining portion of the scheduling cycle 425.

The periodic reception mode of operation may additionally have an associated periodic reception inactivity timer (not shown). In some cases, the UE 115 may initiate an inactivity timer at the start of the inactive period (i.e., the end of the scheduling interval 420). During this inactive period, if the UE 115 receives additional signals prior to expiration of the periodic reception inactivity timer, then the UE 115 may re-enter an additional active duration 420-*b* (such as an additional scheduling interval 420-*b*). The UE 115 may then reset the periodic reception inactivity timer to restart at the end of this active duration 420-*b*. In some cases, a value of the periodic reception inactivity timer may be set to "0." That is, in periodic reception mode, because the periodic reception inactivity timer is set to "0," a UE 115 may immediately power down and transition into "sleep" mode after completion of the scheduling interval 420. As previously described with reference to FIG. 3, the base station 105 may be configured to buffer data traffic during the period when the UE is in "sleep" mode. The base station 105 may then transmit multiple data packets (such as a combined data packet) during a transmission opportunity. In some cases, the data transmission may occur in one or more transport blocks.

According to one or more aspects of the present disclosure, the UE 115 may receive an activation signal for a periodic reception mode. In some cases, the activation signal may be received as a MAC layer control element indicating activation of the periodic reception mode. In some aspects, the activation signal may be included in a DCI. Additionally, or alternatively, the UE 115 may receive the activation signal as part of an RRC configuration message. The UE 115 may identify a periodic schedule in the activation signal. In some cases, the periodic schedule may indicate the duration and/or periodicity for the scheduling intervals 420 and the scheduling cycles 425. In some cases, upon receiving the periodic schedule, the UE 115 may be configured to monitor a channel and sleep, in accordance with the periodic schedule.

In some cases, the UE 115 may receive an indication to activate a periodic reception mode. As previously discussed, the periodic reception mode may include a duration for scheduling intervals 420 and scheduling cycles 425. In some cases, the duration for scheduling intervals 420 may be fixed. In some cases, the duration for scheduling intervals 420 may be configured by a network based on scheduling load at the base station 105. In some cases, the duration for scheduling cycles 425 may be fixed. The duration for scheduling cycles 425 may be either configured by network or recommended by UE 115.

In some cases, the UE 115 may estimate an arrival rate of date packets and may provide a recommendation for a duration of the scheduling cycle 425. That is, the UE 115 may determine a recommended value of a parameter associated with the periodic schedule. In some cases, the recommended value may include a recommended duration of scheduling intervals 420 for the periodic reception mode, a recommended duration of scheduling cycles 425 for the periodic reception mode, a recommended duration of a periodic reception inactivity timer for the periodic reception mode, or any combination. In some aspects, the UE 115 may indicate the recommended value of the parameter to the base station 105.

According to one or more aspects of the present disclosure, the UE 115 may receive an indication of a duration of scheduling intervals 420 for monitoring the control channel while in the periodic reception mode. As demonstrated in FIG. 4, the scheduling intervals 420 may be subsets of scheduling cycles 425 for the periodic reception mode. In some cases, the UE 115 may determine a recommended duration of scheduling cycles 425 based on the duration of scheduling intervals 420, a throughput of a wireless link associated with the base station 105, a rate of data arrival at the base station 105, and a latency tolerance for an application associated with the data. The UE 115 may receive a value of a scheduling interval (T0) from the base station 105. The UE 115 may also determine an estimated throughput (S) of a wireless link and an estimated/measured rate of arrival of data (X). In some cases, for example, the UE 115 may determine the wireless throughput (S) based on a modulation coding scheme (MCS) used for an associated wireless link. As another example, the UE 115 may determine the estimated/measured rate of arrival of data (X) based on the rate of data arrival at the UE 115 (e.g., the UE 115 may assume that the rate of data arrival at the base station 105 is equal to the rate of data arrival at the UE 115). In some cases, the UE 115 may determine a duty cycle ratio (S/X) as a ratio between the throughput (S) of the wireless link, and the rate of arrival of data (X). In some examples, the UE 115 may be configured to determine a recommended duration of scheduling cycles 425 based on an application delay-requirement value (Tr) and a product of the scheduling interval (T0) and a duty cycle ratio (S/X).

In some cases, the UE 115 may determine that the recommended duration of scheduling cycles 425 is less than a latency tolerance at the UE 115. Upon determining that that the recommended duration of scheduling cycles 425 is less than the latency tolerance, the UE 115 can recommend base station 105 to increase a total bandwidth. For example, the UE 115 may recommend bandwidth part switches, additional carriers, or a combination. This may be beneficial for the UE 115, as an increased bandwidth may result in extension of the scheduling cycle 425 up to the latency tolerance (such as the delay requirement), thereby increasing the power savings at the UE 115. In some cases, the UE 115 may be configured to choose a total bandwidth for downlink transmission and a total bandwidth for uplink transmissions, such that both the downlink and uplink transmissions have the same duty cycle ratio. In some cases, the UE 115 may also indicate the antenna(s) that are to be used for upcoming communications, as part of the recommended parameters. In some aspects, the UE 115 may determine that the recommended duration of scheduling cycles 425 is greater than the latency tolerance. In such cases, the UE 115 may transmit a request for reduced bandwidth to the base station 105.

In some aspects, a periodic reception mode can be configured independently from regular DRX mode. A UE 115 may be configured with periodic reception mode independent of the DRX mode. The periodic reception mode may be particularly beneficial for UEs 115 associating more traffic. In some cases, the UE 115 may be configured with both periodic reception mode and DRX mode. In some cases, a UE 115 may restart the periodic reception inactivity timer upon receiving a data packet. If, however, the UE 115 does not receive any data until the periodic reception inactivity timer expires, the UE 115 may be configured to switch to DRX mode from the periodic reception mode. In some cases, the DRX mode may not be configured at the UE 115. In such cases, the periodic reception inactivity timer may not be used. Additionally, or alternatively, the periodic reception inactivity timer may reuse the same DRX inactivity timer. Start upon activation of periodic reception mode and restart by each new data transmission/reception.

Generally, the UE 115 may receive a MAC control element and may dynamically switch to periodic reception mode. In some cases, the base station 105 may indicate activation of a DRX mode during an RRC configuration and may indicate activation of a periodic reception mode using a MAC control element. In some cases, the UE 115 may already be configured with a duration of a scheduling interval 420 and a duration of a scheduling cycle 425 (such as during an RRC procedure). Upon receiving the MAC control element, the UE 115 may activate the periodic reception mode, and begin monitoring the channel according to the scheduling intervals 420. In some cases, if a change in pattern of the data traffic is detected at the base station 105, the base station 105 (or network) may change the parameters (such as scheduling intervals 420 and scheduling cycles 425) associated with the periodic reception mode based on the change in traffic pattern. In some cases, the base station 105 may transmit the indication of the change to the UE 115 using a MAC control element. In some cases, the periodic reception mode may be activated and deactivated by a DCI. In some cases, an information element may be used to configure periodic reception mode at the UE 115. In some cases, the information element may include a field for the scheduling interval, a field for the scheduling cycle, and a field for the periodic reception inactivity timer. In some cases, the field for the periodic reception inactivity timer may be an optional field. The fields of the information element may be in units of time (e.g., ms).

In some cases, a periodic reception inactivity timer may be started when a periodic reception mode is activated and restarted by each new data transmission/reception. The UE 115 may deactivate the periodic reception mode by receiving a deactivation signal in a MAC control element or by expiry of the periodic reception inactivity timer. Upon deactivation of the periodic reception mode, the UE 115 may be configured to return to a continuous monitoring mode.

In some cases, the UE 115 may be configured with both periodic reception mode and the DRX mode. In such cases, both the periodic reception mode and the DRX mode may be activated using a MAC control. Activation of the periodic reception mode may be performed within either the DRX mode or continuous monitoring mode. In some cases, the UE 115 may be configured to use the DRX inactivity timer for the periodic reception mode. Upon deactivation of the periodic reception mode, the UE 115 may transition into the DRX mode. In some examples, the UE 115 may receive a wake up signal indicating a presence of data for the UE. The UE 115 may be configured to monitor the control channel in accordance with the periodic schedule and based on the wake up signal. In such cases, upon receiving a wake up signal, the UE 115 may be configured to wake up and monitor the control channel during the next ON duration. In the periodic reception mode, the base station 105 may transmit the wake up signal at the beginning of a scheduling interval 420. If the wake up signal (or the absence of the wake up signal) indicates that no data is scheduled for the UE 115, the UE 115 may be configured to skip the following scheduling interval 420.

In some cases, the UE 115 may be configured to receive an indication of a HARQ configuration for the periodic reception mode. In some cases, identifying the activation of the periodic reception mode may include the indication of the HARQ configuration for the periodic reception mode. Upon receiving the indication, the UE 115 may identify a HARQ transmission associated with a scheduling interval 420 of the periodic reception mode and may communicate with a base station based on the HARQ configuration for the periodic reception mode.

In some cases, communicating based on the HARQ configuration includes extending the scheduling interval 420 to accommodate the HARQ transmission (e.g., the UE 115 may continue its existing HARQ retransmissions beyond the end of a scheduling interval) or exchanging the HARQ transmission with the base station during a subsequent scheduling interval (e.g., the UE 115 may postpone any pending HARQ retransmission to the next scheduling interval). In some cases, which HARQ behavior the UE 115 should follow may be configured by the network (e.g., through signaling such as the activation signal, which may be receive by the UE 115 from a base station 105). Thus, in some cases, HARQ retransmissions may be configured to continue beyond a scheduling interval 420. That is, if there is an on-going transmission after the scheduling interval 420, the UE 115 may be configured to complete the on-going transmission prior to transition to the "sleep" mode. In some cases, period and/or aperiodic channel status information (CSI) reports may be sent outside the duration of the scheduling intervals 420.

During periodic reception mode, the UE 115 may transmit a scheduling request during a first scheduling interval. In some cases, the scheduling request may include a request to schedule uplink transmission during the first scheduling interval or during a second scheduling interval of the periodic reception mode that is after the first scheduling interval. In some cases, the UE 115 may determine when to transmit the scheduling request based on a UE implementation. More specifically, the UE 115 may determine whether the scheduling request may be delayed until the next scheduling interval 420 based on a latency tolerance at the UE 115.

In some cases, a random access procedure may override one or more operations of the periodic reception mode. In some cases, uplink configured grants may be aligned with the scheduling intervals 420 of the periodic reception mode. Alternatively, the uplink configured grants may operate independently from operations of the periodic reception mode.

Figure 5:
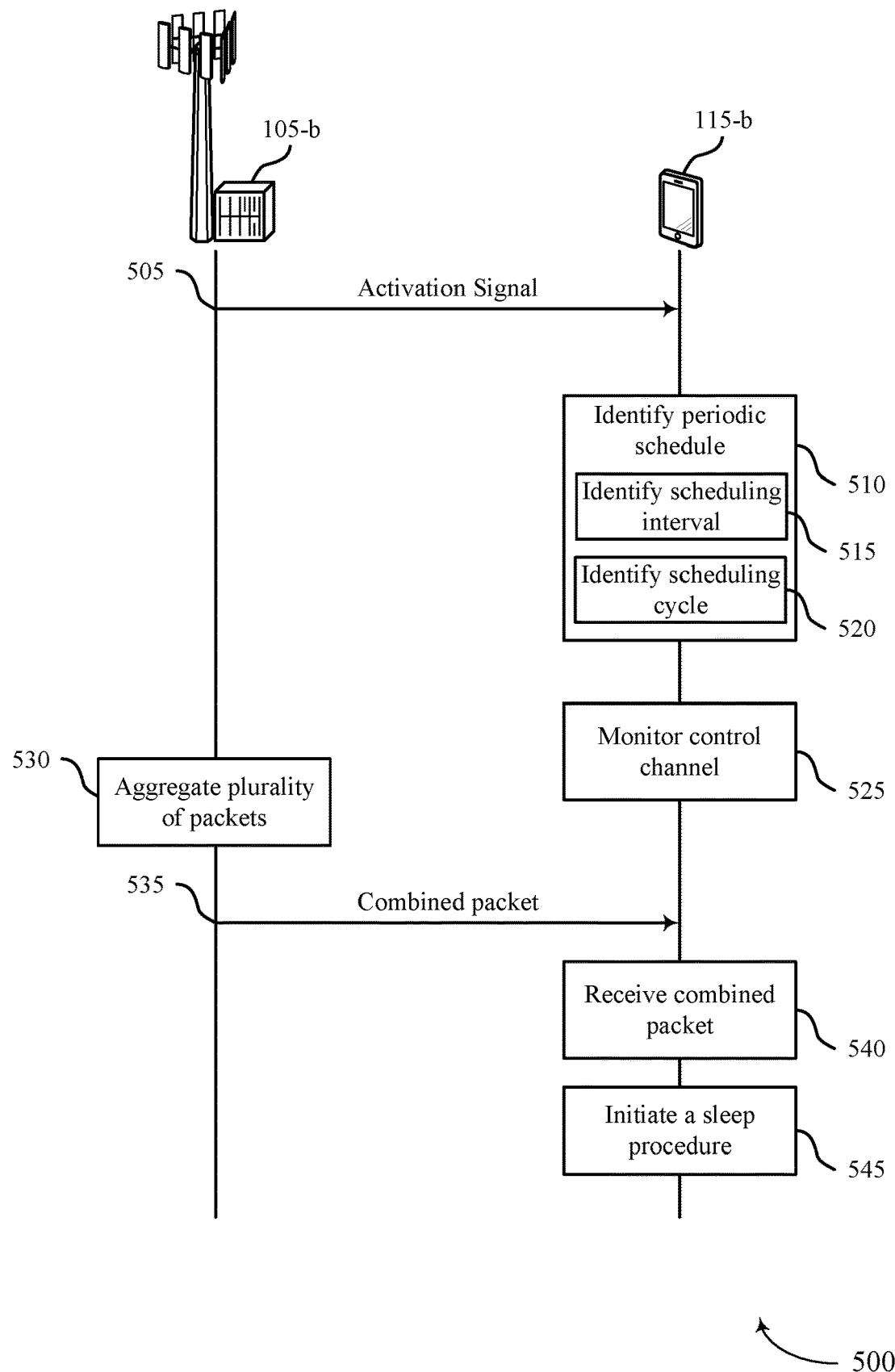
FIG. 5 illustrates an example of a process flow that supports a periodic reception mode for wireless communications in accordance with aspects of the present disclosure.

FIG. 5 illustrates an example of a process flow 500 that supports a periodic reception mode for wireless communications in accordance with aspects of the present disclosure. In some examples, process flow 500 may implement aspects of wireless communications system 100. The process flow 500 may include base station 105-b and UE 115-b, which may be examples of the corresponding devices described with reference to FIGS. 1 through 4. UE 115-b and base station 105-b may support a periodic reception mode for wireless communications to achieve power savings. UE 115-a may be configured (e.g., pre-configured or configured by base station 105-b) to operate on a periodic reception mode in order to efficiently utilize the available resources in the system.

In the following description of the process flow 500, the operations between UE 115-b and base station 105-b may be transmitted in a different order than the exemplary order shown. The operations performed by UE 115-b or base station 105-b may be performed in different orders or at different times than the exemplary order shown. Some operations may also be left out of the process flow 500, or other operations may be added to the process flow 500.

Further, UE 115-*b* and base station 105-*b* are not meant to be representative, as the described features may be associated with any number of devices.

At 505, base station 105-*b* may transmit an activation signal for a periodic reception mode. In some cases, prior to transmitting the activation signal, the base station 105-*b* may identify for the UE 115-*b*, an activation of the periodic reception mode. The activation signal may indicate the UE 115-*b* to activate the periodic reception mode. In some cases, the base station 105-*b* may transmit the activation signal using a MAC layer control element. In some cases, the base station 105-*b* may transmit the activation signal using a DCI. In some cases, the base station 105-*b* may transmit the activation signal using an RRC configuration signaling. Additionally, the RRC configuration signaling may configure UE 115-*b* with a set of parameters associated with the periodic reception mode.

At 510, the UE 115-*b* may identify a periodic schedule, which may include identification a set of parameters (e.g., scheduling parameters) associated with the periodic reception mode. In some cases, the set of parameters associated with the periodic reception mode may include a scheduling interval and a scheduling cycle. At 515, the UE 115-*b* may determine a duration of scheduling intervals for the periodic reception mode based on the received activation signal. In some cases, the duration of the scheduling intervals may be configured by the base station 105-*b* and may be based on a scheduling load at the base station 105-*b*.

At 515, the UE 115-*b* may determine a duration of scheduling cycles for the periodic reception mode based on the received indication. In some cases, the scheduling cycle may include a respective scheduling interval. In some cases, the UE 115-*b* may be configured to monitor for data and/or control information in accordance with the scheduling interval included in the scheduling cycle and may sleep for a remaining duration of the scheduling cycle.

At 520, the UE 115-*b* may monitor a control channel in accordance with a periodic schedule associated with the periodic reception mode. In some cases, the UE 115-*b* may monitor the control channel based on receiving the activation signal for the periodic reception mode. In some examples, the UE 115-*b* may monitor the control channel in accordance with the scheduling interval determined at 515.

At 530, the base station 105-*b* may identify data for communication with UE 115-*b*. In some cases, the base station 105-*b* may aggregate multiple packets to create a combined transmission. In some cases, the packets may include at least a first packet and a second packet received after the first packet. In some cases, the base station 105-*b* may form a single packet based on the plurality of packets, where the combined transmission includes the single packet. In some cases, the base station 105-*b* may form a burst of packets based on the plurality of packets, where the combined transmission includes the burst of packets. In some cases, prior to aggregating, the base station 105-*b* may determine a rate of data arrival for the UE 115-*b* based on a time difference between receiving the first packet and the second packet. The base station 105 may then determine that the rate of data arrival for the UE 115-*b* is less than a throughput of a wireless link associated with the UE 115-*b*. In such a case, the base station 105-*b* may aggregate the data packets in order to enhance power savings at the UE.

At 535, the base station 105-*b* may transmit the combined transmission to the UE 115-*b* in accordance with a periodic schedule associated with the periodic reception mode. That is, the base station 105-*b* may transmit the combined transmission during the scheduling interval of the periodic reception mode.

At 540, the UE 115-*b* may receive the combined transmission according to the periodic schedule. In some cases, the UE 115-*b* may receive the combined transmission during the scheduling interval of the periodic reception mode. At 545, the UE 115-*b* may initiate a sleep procedure. In other words, the UE 115-*b* may operate according to a low power mode. For example, the UE 115-*b* may be "asleep," and may not transmit or receive data in this low power mode. UE 115-*b* may periodically continue to monitor for data during subsequent scheduling intervals.

Figure 6:
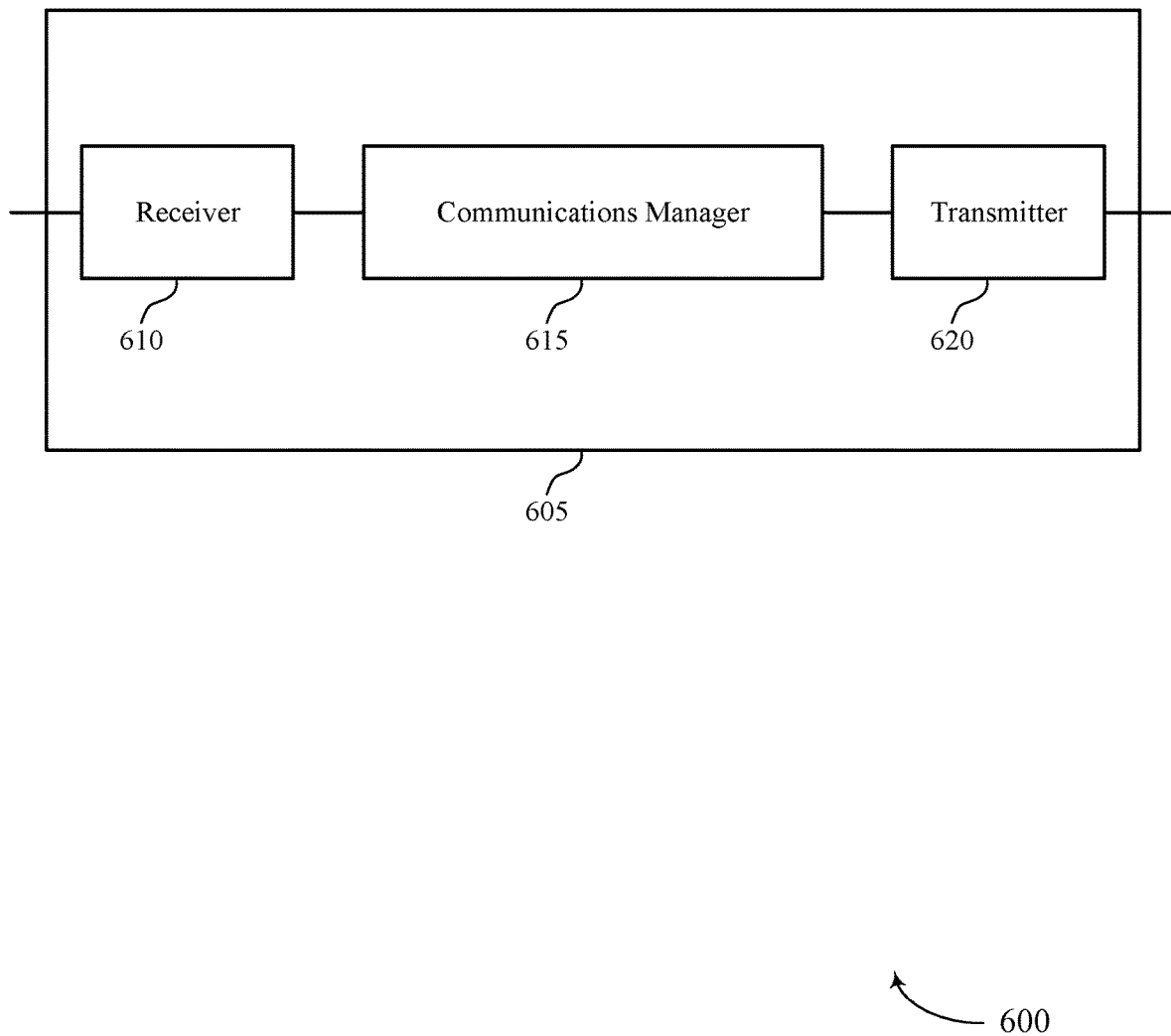
FIGS. 6 and 7 show diagrams of devices that support a periodic reception mode for wireless communications in accordance with aspects of the present disclosure.

FIG. 6 shows a diagram 600 of a device 605 that supports a periodic reception mode for wireless communications in accordance with aspects of the present disclosure. The device 605 may be an example of aspects of a UE 115 as described herein. The device 605 may include a receiver 610, a communications manager 615, and a transmitter 620. The device 605 may also include a processor. Each of these components may be in communication with one another (e.g., via one or more buses).

The receiver 610 may receive information such as packets, user data, or control information associated with various information channels (e.g., control channels, data channels, and information related to periodic reception mode for wireless communications, etc.). Information may be passed on to other components of the device 605. The receiver 610 may be an example of aspects of the transceiver 920 described with reference to FIG. 9. The receiver 610 may utilize a single antenna or a set of antennas.

The communications manager 615 may identify an activation of a periodic reception mode. In some cases, the communications manager 615 may receive an activation signal for a periodic reception mode. The communications manager 615 may monitor, based on identifying the activation of the periodic reception mode, a control channel in accordance with a periodic schedule associated with the periodic reception mode, and sleep, based on identifying the activation of the periodic reception mode, in accordance with the periodic schedule associated with the periodic reception mode. The communications manager 615 may be an example of aspects of the communications manager 910 described herein.

The communications manager 615, or its sub-components, may be implemented in hardware, code (e.g., software or firmware) executed by a processor, or any combination thereof. If implemented in code executed by a processor, the functions of the communications manager 615, or its sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The communications manager 615, or its sub-components, may be physically located at various positions, including being distributed such that portions of functions are implemented at different physical locations by one or more physical components. In some examples, the communications manager 615, or its sub-components, may be a separate and distinct component in accordance with various aspects of the present disclosure. In some examples, the communications manager 615, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 620 may transmit signals generated by other components of the device 605. In some examples, the transmitter 620 may be collocated with a receiver 610 in a transceiver module. For example, the transmitter 620 may be an example of aspects of the transceiver 920 described with reference to FIG. 9. The transmitter 620 may utilize a single antenna or a set of antennas.

Figure 7:
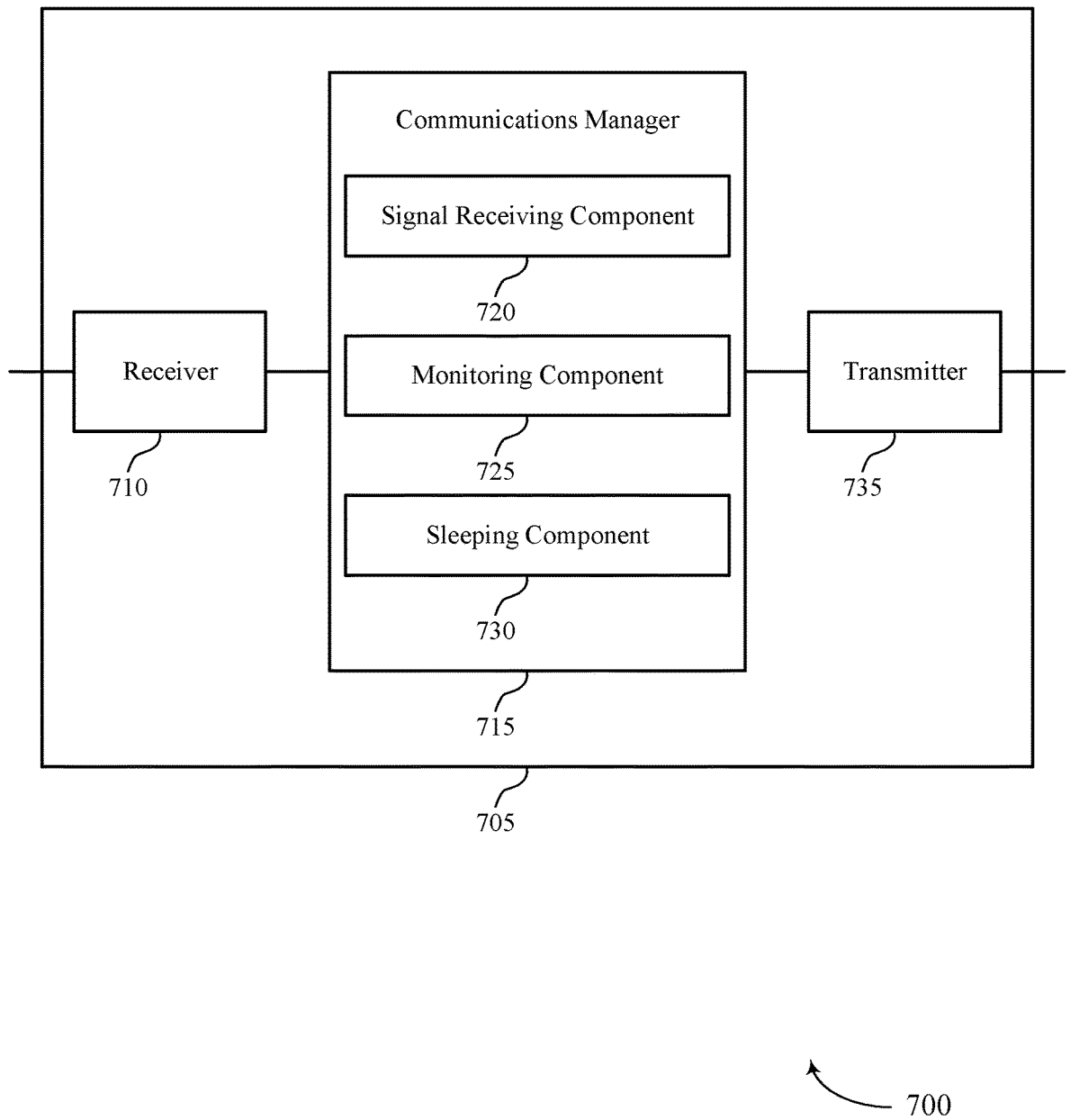

FIG. 7 shows a diagram 700 of a device 705 that supports a periodic reception mode for wireless communications in accordance with aspects of the present disclosure. The device 705 may be an example of aspects of a device 605, or a UE 115 as described herein. The device 705 may include a receiver 710, a communications manager 715, and a transmitter 735. The device 705 may also include a processor. Each of these components may be in communication with one another (e.g., via one or more buses).

The receiver 710 may receive information such as packets, user data, or control information associated with various information channels (e.g., control channels, data channels, and information related to periodic reception mode for wireless communications, etc.). Information may be passed on to other components of the device 705. The receiver 710 may be an example of aspects of the transceiver 920 described with reference to FIG. 9. The receiver 710 may utilize a single antenna or a set of antennas.

The communications manager 715 may be an example of aspects of the communications manager 615 as described herein. The communications manager 715 may include a signal receiving component 720, a monitoring component 725, and a sleeping component 730. The communications manager 715 may be an example of aspects of the communications manager 910 described herein.

The signal receiving component 720 may identify an activation of a periodic reception mode. For example, the signal receiving component 720 may receive an activation signal for the periodic reception mode. The monitoring component 725 may monitor, based on identifying the activation of the periodic reception mode, a control channel in accordance with a periodic schedule associated with the periodic reception mode. The sleeping component 730 may sleep, based on identifying the activation of the periodic reception mode, in accordance with the periodic schedule associated with the periodic reception mode.

The transmitter 735 may transmit signals generated by other components of the device 705. In some examples, the transmitter 735 may be collocated with a receiver 710 in a transceiver module. For example, the transmitter 735 may be an example of aspects of the transceiver 920 described with reference to FIG. 9. The transmitter 735 may utilize a single antenna or a set of antennas.

Figure 8:
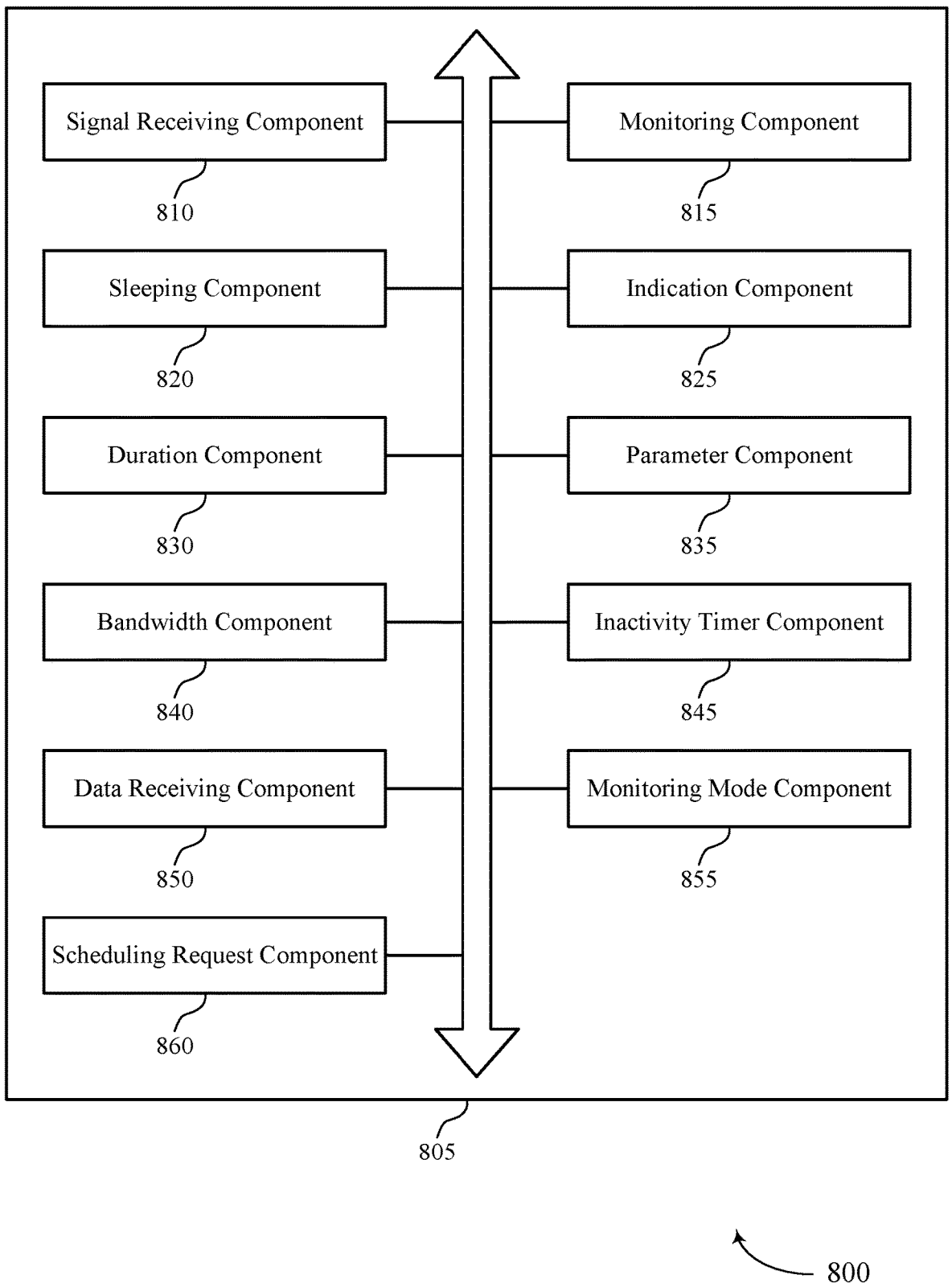
FIG. 8 shows a diagram of a communications manager that supports a periodic reception mode for wireless communications in accordance with aspects of the present disclosure.

FIG. 8 shows a diagram 800 of a communications manager 805 that supports a periodic reception mode for wireless communications in accordance with aspects of the present disclosure. The communications manager 805 may be an example of aspects of a communications manager 615, a communications manager 715, or a communications manager 910 described herein. The communications manager 805 may include a signal receiving component 810, a monitoring component 815, a sleeping component 820, an indication component 825, a duration component 830, a parameter component 835, a bandwidth component 840, an inactivity timer component 845, a data receiving component 850, a monitoring mode component 855, and a scheduling request component 860. Each of these modules may communicate, directly or indirectly, with one another (e.g., via one or more buses).

The signal receiving component 810 may identify an activation of a periodic reception mode. In some cases, the signal receiving component 810 may receive an activation signal for the periodic reception mode. In some examples, the signal receiving component 810 may receive a MAC layer control element indicating activation of the periodic reception mode, the MAC layer control element indicating one or more parameter values associated with the periodic schedule.

In some examples, the signal receiving component 810 may receive a DCI indicating activation of the periodic reception mode, the DCI indicating one or more parameter values associated with the periodic schedule. In some examples, the signal receiving component 810 may receive an RRC configuration message that indicates one or more parameter values associated with the periodic schedule. In some examples, the signal receiving component 810 may receive a MAC layer control element indicating deactivation of the periodic reception mode. In some examples, the signal receiving component 810 may receive from a base station, a wake up signal indicating a presence of data for the UE, where monitoring the control channel in accordance with the periodic schedule is based on the wake up signal.

The monitoring component 815 may monitor, based on identifying the activation of the periodic reception mode, a control channel in accordance with a periodic schedule associated with the periodic reception mode. The sleeping component 820 may sleep, based on identifying the activation of the periodic reception mode, in accordance with the periodic schedule associated with the periodic reception mode. The indication component 825 may receive an indication of the periodic schedule associated with the periodic reception mode.

The duration component 830 may determine a duration of scheduling intervals for the periodic reception mode based on the received indication, where monitoring the control channel in accordance with the periodic schedule includes monitoring the control channel during the scheduling intervals. In some examples, determining a duration of scheduling cycles for the periodic reception mode based on the received indication, where a scheduling cycle includes a respective scheduling interval, and where sleeping in accordance with the periodic schedule includes sleeping during a portion of the scheduling cycle outside the respective scheduling interval.

In some examples, the duration component 830 may receive, from a base station, an indication of a duration of scheduling intervals for monitoring the control channel while in the periodic reception mode, where scheduling intervals are subsets of scheduling cycles for the periodic reception mode. In some examples, the duration component 830 may determine a recommended duration of scheduling cycles based on the duration of scheduling intervals, a throughput of a wireless link associated with the base station, a rate of data arrival at the base station, a latency tolerance for an application associated with the data, or any combination thereof.

In some examples, the duration component 830 may determine a ratio between the throughput of the wireless link and the rate of arrival. In some examples, the duration component 830 may determine the recommended duration of scheduling cycles based on the ratio. In some examples, the duration component 830 may determine the recommended duration of scheduling cycles based on multiplying the duration of scheduling intervals by the ratio. In some examples, the duration component 830 may determine that the recommended duration of scheduling cycles is less than the latency tolerance. In some examples, the duration component 830 may determine that the recommended duration of scheduling cycles is greater than the latency tolerance. In some cases, the duration of the scheduling intervals is based on a scheduling load at a base station.

The parameter component 835 may determine a recommended value of a parameter associated with the periodic schedule. In some examples, the parameter component 835 may transmit, to a base station, the recommended value of the parameter associated with the periodic schedule. In some cases, the recommended value of the parameter includes a recommended duration of scheduling intervals for the periodic reception mode, a recommended duration of scheduling cycles for the periodic reception mode, a recommended duration of an inactivity timer for the periodic reception mode, or any combination thereof.

The bandwidth component 840 may transmit, to the base station, a request for increased bandwidth based on the recommended duration of scheduling cycles being less than the latency tolerance. In some examples, the bandwidth component 840 may transmit, to the base station, a request for reduced bandwidth based on the recommended duration of scheduling cycles being greater than the latency tolerance.

The inactivity timer component 845 may initialize a periodic reception inactivity timer based on identifying the activation of the periodic reception mode. In some examples, the inactivity timer component 845 may restart the periodic reception inactivity timer after receiving the data. In some examples, the inactivity timer component 845 may determine an expiration of the periodic reception inactivity timer.

The data receiving component 850 may receive data while monitoring the control channel in accordance with the periodic schedule. The monitoring mode component 855 may resume a continuous monitoring mode based on the expiration of the periodic reception inactivity timer. In some examples, the monitoring mode component 855 may switch from the periodic reception mode to a DRX mode based on the expiration of the periodic reception inactivity timer. The scheduling request component 860 may transmit a scheduling request during a first scheduling interval of the periodic reception mode, the scheduling request including a request to schedule uplink transmission during the first scheduling interval or during a second scheduling interval of the periodic reception mode that is after the first scheduling interval. In some cases, the scheduling request component 860 may receive an indication of a HARQ configuration for the periodic reception mode, identify a HARQ transmission associated with a scheduling interval of the periodic reception mode, and communicate with a base station based on the HARQ configuration for the periodic reception mode. In some cases, communicating based on the HARQ configuration may include at least one of extending the scheduling interval to accommodate the HARQ transmission or exchanging the HARQ transmission with the base station during a subsequent scheduling interval. In some cases, identifying the activation of the periodic reception mode may include the indication of the HARQ configuration for the periodic reception mode.

Figure 9:
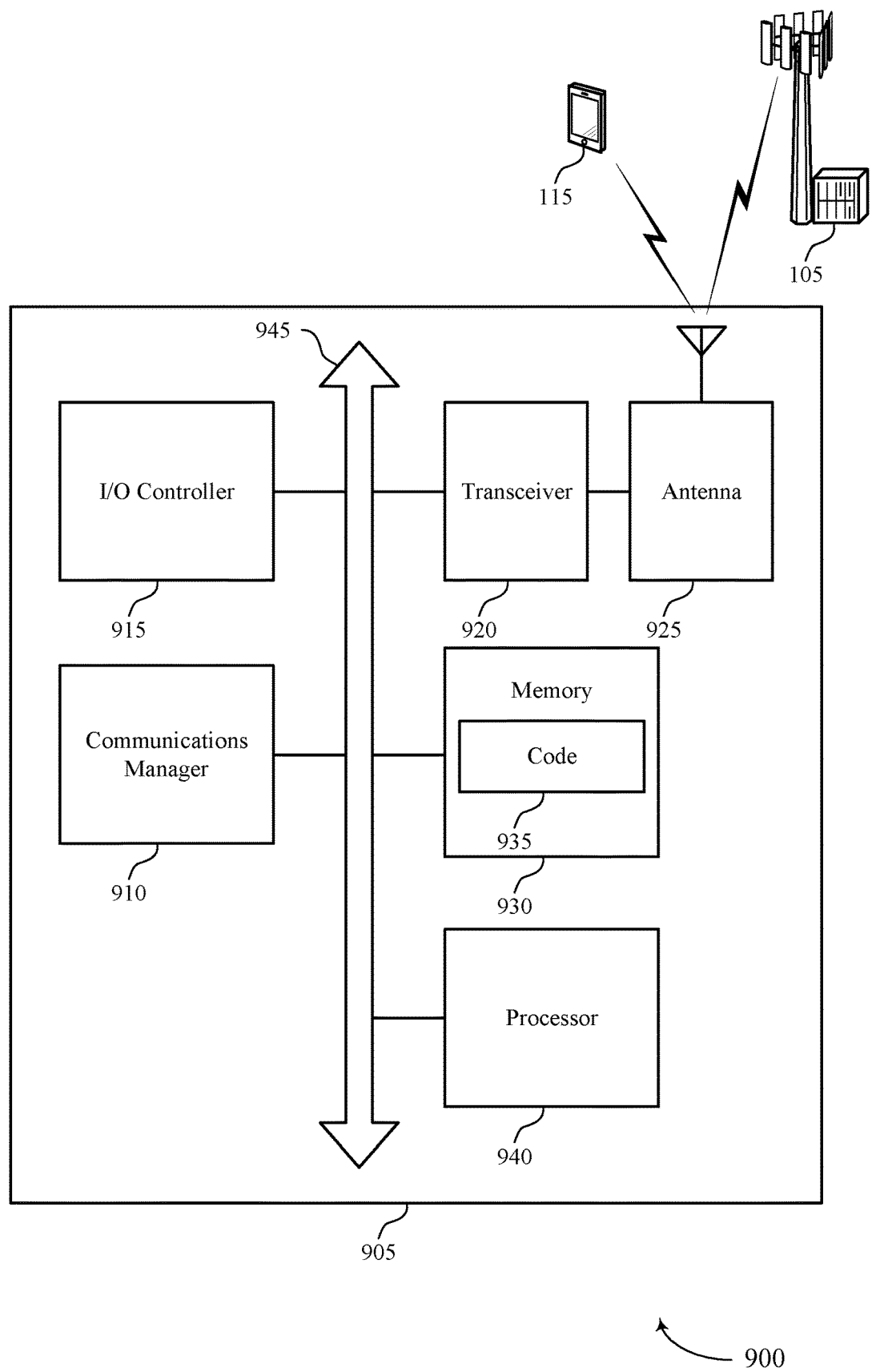
FIG. 9 shows a diagram of a system including a device that supports a periodic reception mode for wireless communications in accordance with aspects of the present disclosure.

FIG. 9 shows a diagram of a system 900 including a device 905 that supports a periodic reception mode for wireless communications in accordance with aspects of the present disclosure. The device 905 may be an example of or include the components of device 605, device 705, or a UE 115 as described herein. The device 905 may include components for bi-directional voice and data communications including components for transmitting and receiving communications, including a communications manager 910, an I/O controller 915, a transceiver 920, an antenna 925, memory 930, and a processor 940. These components may be in electronic communication via one or more buses (e.g., bus 945).

The communications manager 910 may identify an activation of a periodic reception mode. In some cases, the communications manager 910 may receive an activation signal for the periodic reception mode, monitor, based on identifying the activation of the periodic reception mode, a control channel in accordance with a periodic schedule associated with the periodic reception mode, and sleep, based on identifying the activation of the periodic reception mode, in accordance with the periodic schedule associated with the periodic reception mode.

The I/O controller 915 may manage input and output signals for the device 905. The I/O controller 915 may also manage peripherals not integrated into the device 905. In some cases, the I/O controller 915 may represent a physical connection or port to an external peripheral. In some cases, the I/O controller 915 may utilize an operating system such as iOS®, ANDROID®, MS-DOS®, MS-WINDOWS®, OS/2®, UNIX®, LINUX®, or another known operating system. In other cases, the I/O controller 915 may represent or interact with a modem, a keyboard, a mouse, a touchscreen, or a similar device. In some cases, the I/O controller 915 may be implemented as part of a processor. In some cases, a user may interact with the device 905 via the I/O controller 915 or via hardware components controlled by the I/O controller 915.

The transceiver 920 may communicate bi-directionally, via one or more antennas, wired, or wireless links as described herein. For example, the transceiver 920 may represent a wireless transceiver and may communicate bi-directionally with another wireless transceiver. The transceiver 920 may also include a modem to modulate the packets and provide the modulated packets to the antennas for transmission, and to demodulate packets received from the antennas. In some cases, the wireless device may include a single antenna 925. However, in some cases the device may have more than one antenna 925, which may be capable of concurrently transmitting or receiving multiple wireless transmissions.

The memory 930 may include random-access memory (RAM) and read-only memory (ROM). The memory 930 may store computer-readable, computer-executable code 935 including instructions that, when executed, cause the processor to perform various functions described herein. In some cases, the memory 930 may contain, among other things, a basic input/output system (BIOS) which may control basic hardware or software operation such as the interaction with peripheral components or devices.

The processor 940 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In other cases, a memory controller may be integrated into the processor 940. The processor 940 may be configured to execute computer-readable instructions stored in a memory (e.g., the memory 930) to cause the device 905 to perform various functions (e.g., functions or tasks supporting periodic reception mode for wireless communications).

The code 935 may include instructions to implement aspects of the present disclosure, including instructions to support wireless communications. The code 935 may be stored in a non-transitory computer-readable medium such as system memory or other type of memory. In some cases, the code 935 may not be directly executable by the processor 940 but may cause a computer (e.g., when compiled and executed) to perform functions described herein.

Figure 10:
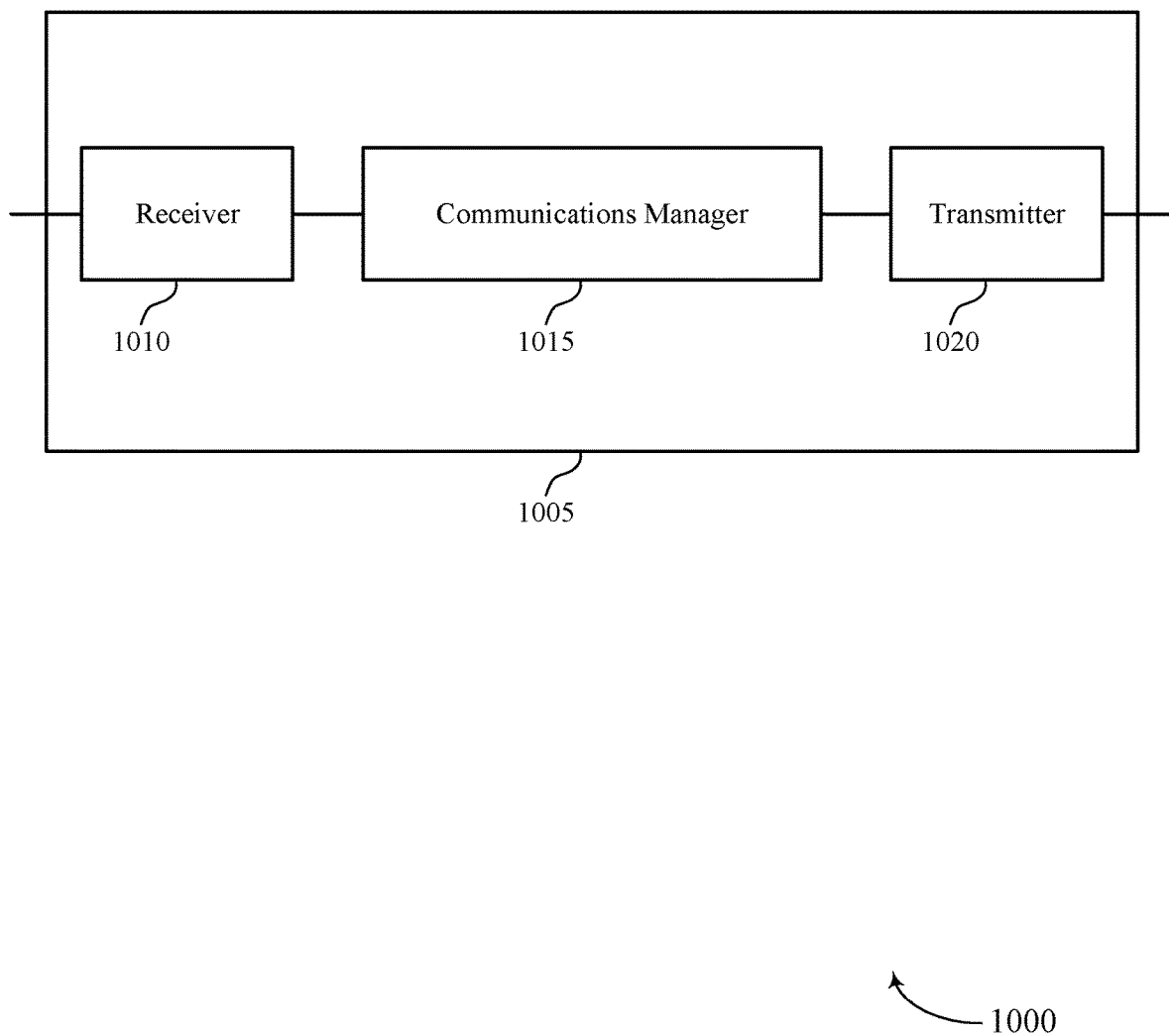
FIGS. 10 and 11 show diagrams of devices that support a periodic reception mode for wireless communications in accordance with aspects of the present disclosure.

FIG. 10 shows a diagram 1000 of a device 1005 that supports a periodic reception mode for wireless communications in accordance with aspects of the present disclosure. The device 1005 may be an example of aspects of a base station 105 as described herein. The device 1005 may include a receiver 1010, a communications manager 1015, and a transmitter 1020. The device 1005 may also include a processor. Each of these components may be in communication with one another (e.g., via one or more buses).

The receiver 1010 may receive information such as packets, user data, or control information associated with various information channels (e.g., control channels, data channels, and information related to periodic reception mode for wireless communications, etc.). Information may be passed on to other components of the device 1005. The receiver 1010 may be an example of aspects of the transceiver 1320 described with reference to FIG. 13. The receiver 1010 may utilize a single antenna or a set of antennas.

The communications manager 1015 may identify, for a UE, an activation of a periodic reception mode. In some cases, the communications manager 1015 may transmit, to the UE, an activation signal for the periodic reception mode, aggregate, based on the activation of the periodic reception mode, a set of packets for the UE to create a combined transmission, the set of packets including at least a first packet and a second packet received after the first packet, and transmit the combined transmission to the UE in accordance with a periodic schedule associated with the periodic reception mode. The communications manager 1015 may be an example of aspects of the communications manager 1310 described herein.

The communications manager 1015, or its sub-components, may be implemented in hardware, code (e.g., software or firmware) executed by a processor, or any combination thereof. If implemented in code executed by a processor, the functions of the communications manager 1015, or its sub-components may be executed by a general-purpose processor, a DSP, an ASIC, an FPGA or other programmable logic device, discrete gate or transistor logic, discrete hardware components, or any combination thereof designed to perform the functions described in the present disclosure.

The communications manager 1015, or its sub-components, may be physically located at various positions, including being distributed such that portions of functions are implemented at different physical locations by one or more physical components. In some examples, the communications manager 1015, or its sub-components, may be a separate and distinct component in accordance with various aspects of the present disclosure. In some examples, the communications manager 1015, or its sub-components, may be combined with one or more other hardware components, including but not limited to an I/O component, a transceiver, a network server, another computing device, one or more other components described in the present disclosure, or a combination thereof in accordance with various aspects of the present disclosure.

The transmitter 1020 may transmit signals generated by other components of the device 1005. In some examples, the transmitter 1020 may be collocated with a receiver 1010 in a transceiver module. For example, the transmitter 1020 may be an example of aspects of the transceiver 1320 described with reference to FIG. 13. The transmitter 1020 may utilize a single antenna or a set of antennas.

Figure 11:
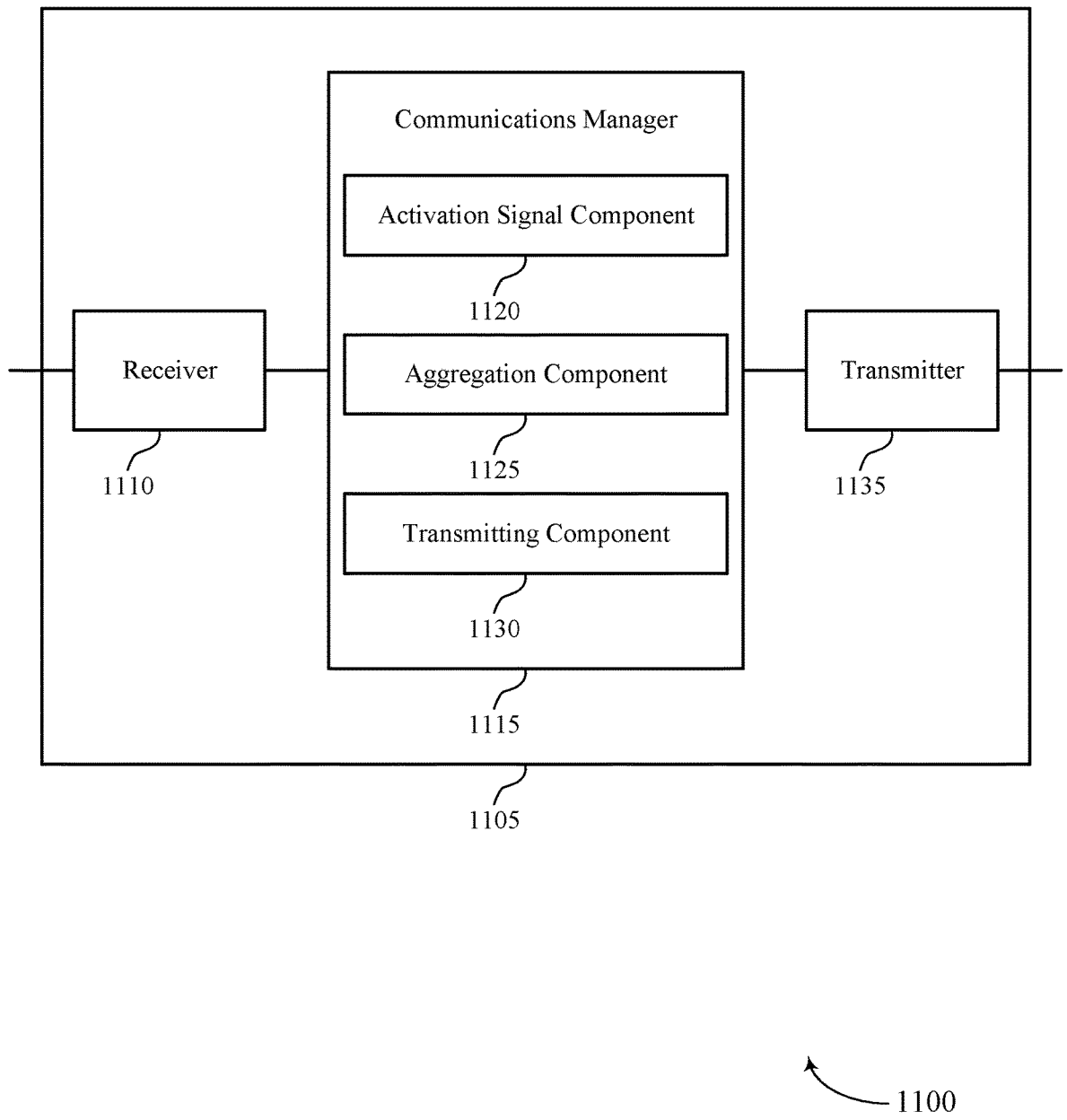

FIG. 11 shows a diagram 1100 of a device 1105 that supports a periodic reception mode for wireless communications in accordance with aspects of the present disclosure. The device 1105 may be an example of aspects of a device 1005, or a base station 105 as described herein. The device 1105 may include a receiver 1110, a communications manager 1115, and a transmitter 1135. The device 1105 may also include a processor. Each of these components may be in communication with one another (e.g., via one or more buses).

The receiver 1110 may receive information such as packets, user data, or control information associated with various information channels (e.g., control channels, data channels, and information related to periodic reception mode for wireless communications, etc.). Information may be passed on to other components of the device 1105. The receiver 1110 may be an example of aspects of the transceiver 1320 described with reference to FIG. 13. The receiver 1110 may utilize a single antenna or a set of antennas.

The communications manager 1115 may be an example of aspects of the communications manager 1015 as described herein. The communications manager 1115 may include an activation signal component 1120, an aggregation component 1125, and a transmitting component 1130. The communications manager 1115 may be an example of aspects of the communications manager 1310 described herein.

The activation signal component 1120 may identify, for a UE, an activation of a periodic reception mode. In some cases, the activation signal component 1120 may transmit, to the UE, an activation signal for a periodic reception mode. The aggregation component 1125 may aggregate, based on the activation of the periodic reception mode, a set of packets for the UE to create a combined transmission, the set of packets including at least a first packet and a second packet received after the first packet. In some cases, the aggregation component 1125 may form a single packet based on the plurality of packets, where the combined transmission includes the single packet. In some cases, the aggregation component 1125 may form a burst of packets based on the plurality of packets, where the combined transmission includes the burst of packets. The transmitting component 1130 may transmit the combined transmission to the UE in accordance with a periodic schedule associated with the periodic reception mode.

The transmitter 1135 may transmit signals generated by other components of the device 1105. In some examples, the transmitter 1135 may be collocated with a receiver 1110 in a transceiver module. For example, the transmitter 1135 may be an example of aspects of the transceiver 1320 described with reference to FIG. 13. The transmitter 1135 may utilize a single antenna or a set of antennas.

Figure 12:
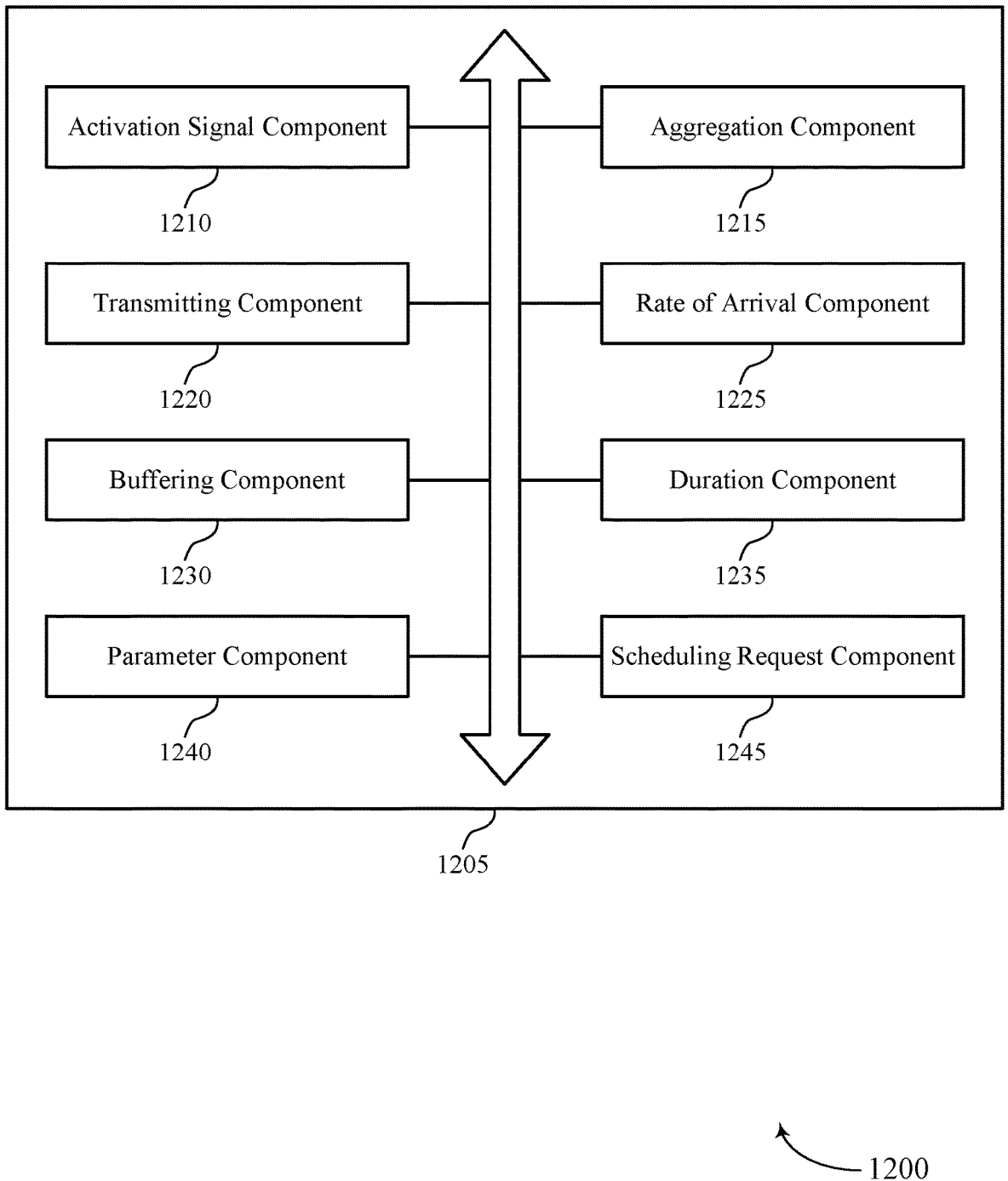
FIG. 12 shows a diagram of a communications manager that supports a periodic reception mode for wireless communications in accordance with aspects of the present disclosure.

FIG. 12 shows a diagram 1200 of a communications manager 1205 that supports a periodic reception mode for wireless communications in accordance with aspects of the present disclosure. The communications manager 1205 may be an example of aspects of a communications manager 1015, a communications manager 1115, or a communications manager 1310 described herein. The communications manager 1205 may include an activation signal component 1210, an aggregation component 1215, a transmitting component 1220, a rate of arrival component 1225, a buffering component 1230, a duration component 1235, a parameter component 1240, and a scheduling request component 1245. Each of these modules may communicate, directly or indirectly, with one another (e.g., via one or more buses).

The activation signal component 1210 may identify, for a UE, an activation of a periodic reception mode. The activation signal component 1210 may transmit, to the UE, an activation signal for a periodic reception mode. The aggregation component 1215 may aggregate, based on the activation of the periodic reception mode, a set of packets for the UE to create a combined transmission, the set of packets including at least a first packet and a second packet received after the first packet. In some cases, the aggregation component 1215 may form a single packet based on the plurality of packets, where the combined transmission includes the single packet. In some cases, the aggregation component 1215 may form a burst of packets based on the plurality of packets, where the combined transmission includes the burst of packets.

The transmitting component 1220 may transmit the combined transmission to the UE in accordance with a periodic schedule associated with the periodic reception mode. In some examples, transmitting an indication of the determined duration of the scheduling intervals to the UE, where transmitting the combined transmission to the UE in accordance with the periodic schedule includes transmitting the combined transmission to the UE during a scheduling interval.

In some examples, the transmitting component 1220 may transmit an indication of a duration of scheduling cycles for the periodic reception mode, where a scheduling cycle includes a respective scheduling interval. In some examples, the transmitting component 1220 may configure the UE to sleep during a portion of the scheduling cycle outside the respective scheduling interval. In some examples, the transmitting component 1220 may transmit, to the UE, an indication of a duration of scheduling intervals for the periodic reception mode, where scheduling intervals are subsets of scheduling cycles for the periodic reception mode.

In some examples, the transmitting component 1220 may transmit, to the UE, a MAC layer control element indicating activation of the periodic reception mode, the MAC layer control element indicating one or more parameter values associated with the periodic schedule. In some examples, the transmitting component 1220 may transmit, to the UE, a DCI indicating activation of the periodic reception mode, the DCI indicating one or more parameter values associated with the periodic schedule. In some examples, the transmitting component 1220 may transmit, to the UE, an RRC configuration message that indicates one or more parameter values associated with the periodic schedule.

In some examples, the transmitting component 1220 may transmit, to the UE, a MAC layer control element indicating deactivation of the periodic reception mode. In some examples, the transmitting component 1220 may transmit, to the UE, a wake up signal indicating a presence of data for the UE, where transmitting the combined transmission in accordance with the periodic schedule is based on the wake up signal.

The rate of arrival component 1225 may determine a rate of data arrival for the UE based on a time difference between receiving the first packet and the second packet. In some examples, the rate of arrival component 1225 may determine that the rate of data arrival for the UE is less than a throughput of a wireless link associated with the UE, where aggregating the set of packets is based on the rate of data arrival for the UE being less than the throughput of the wireless link associated with the UE.

The buffering component 1230 may buffer the first packet of the set for a duration of time based on the periodic schedule. The duration component 1235 may determine a duration of scheduling intervals for the periodic reception mode based on a scheduling load. In some examples, the duration component 1235 may receive from the UE, an indication of a recommended duration of scheduling cycles, the recommended duration of scheduling cycles based on a throughput of a wireless link associated with the UE, a rate of data arrival for the UE, a latency tolerance for an application associated with the data, or any combination thereof.

In some examples, the duration component 1235 may receive, from the UE, a request for increased bandwidth based on the recommended duration of scheduling cycles being less than the latency tolerance. In some examples, the duration component 1235 may receive, from the UE, a request for reduced bandwidth based on the recommended duration of scheduling cycles being greater than the latency tolerance.

The parameter component 1240 may receive, from the UE, a recommended value of a parameter associated with the periodic schedule, the recommended value of the parameter including a recommended duration of scheduling intervals for the periodic reception mode, a recommended duration of scheduling cycles for the periodic reception mode, a recommended duration of an inactivity timer for the periodic reception mode, or any combination thereof. In some examples, the parameter component 1240 may determine a value of the parameter associated with the periodic schedule based on the recommended value.

The scheduling request component 1245 may receive, from the UE, a scheduling request during a first scheduling interval of the periodic reception mode, the scheduling request including a request to schedule uplink transmission during the first scheduling interval or during a second scheduling interval of the periodic reception mode that is after the first scheduling interval.

Figure 13:
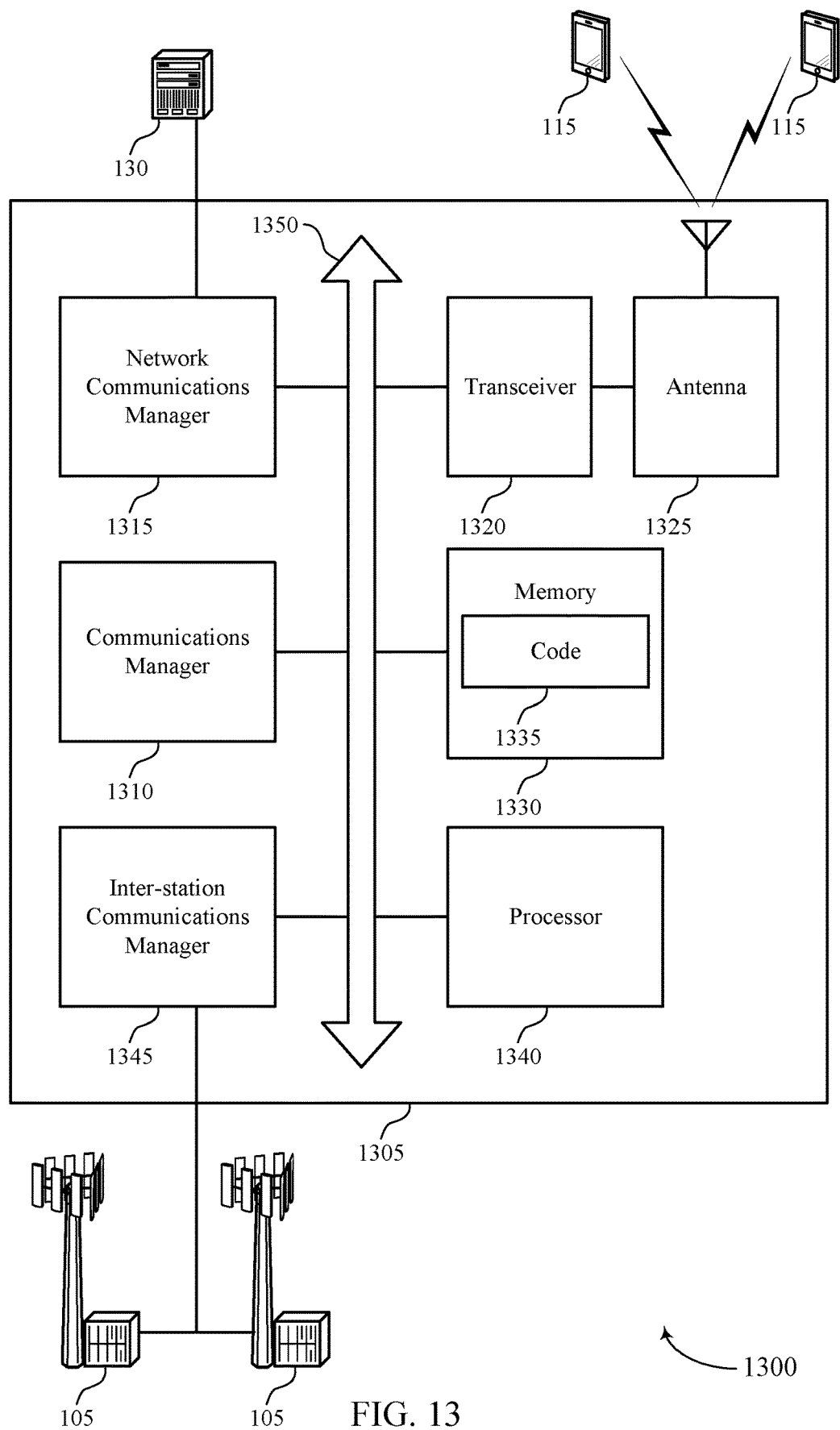
FIG. 13 shows a diagram of a system including a device that supports a periodic reception mode for wireless communications in accordance with aspects of the present disclosure.

FIG. 13 shows a diagram of a system 1300 including a device 1305 that supports a periodic reception mode for wireless communications in accordance with aspects of the present disclosure. The device 1305 may be an example of or include the components of device 1005, device 1105, or a base station 105 as described herein. The device 1305 may include components for bi-directional voice and data communications including components for transmitting and receiving communications, including a communications manager 1310, a network communications manager 1315, a transceiver 1320, an antenna 1325, memory 1330, a processor 1340, and an inter-station communications manager 1345. These components may be in electronic communication via one or more buses (e.g., bus 1350).

The communications manager 1310 may identify, for a UE, an activation of a periodic reception mode. The communications manager 1310 may transmit, to the UE, an activation signal for a periodic reception mode, aggregate, based on the activation of the periodic reception mode, a set of packets for the UE to create a combined transmission, the set of packets including at least a first packet and a second packet received after the first packet, and transmit the combined transmission to the UE in accordance with a periodic schedule associated with the periodic reception mode.

The network communications manager 1315 may manage communications with the core network (e.g., via one or more wired backhaul links). For example, the network communications manager 1315 may manage the transfer of data communications for client devices, such as one or more UEs 115. The transceiver 1320 may communicate bi-directionally, via one or more antennas, wired, or wireless links as described herein. For example, the transceiver 1320 may represent a wireless transceiver and may communicate bi-directionally with another wireless transceiver. The transceiver 1320 may also include a modem to modulate the packets and provide the modulated packets to the antennas for transmission, and to demodulate packets received from the antennas.

In some cases, the wireless device may include a single antenna 1325. However, in some cases the device may have more than one antenna 1325, which may be capable of concurrently transmitting or receiving multiple wireless transmissions. The memory 1330 may include RAM, ROM, or a combination thereof. The memory 1330 may store computer-readable code 1335 including instructions that, when executed by a processor (e.g., the processor 1340) cause the device to perform various functions described herein. In some cases, the memory 1330 may contain, among other things, a BIOS which may control basic hardware or software operation such as the interaction with peripheral components or devices.

The processor 1340 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1340 may be configured to operate a memory array using a memory controller. In some cases, a memory controller may be integrated into processor 1340. The processor 1340 may be configured to execute computer-readable instructions stored in a memory (e.g., the memory 1330) to cause the device 1305 to perform various functions (e.g., functions or tasks supporting periodic reception mode for wireless communications).

The inter-station communications manager 1345 may manage communications with other base station 105 and may include a controller or scheduler for controlling communications with UEs 115 in cooperation with other base stations 105. For example, the inter-station communications manager 1345 may coordinate scheduling for transmissions to UEs 115 for various interference mitigation techniques such as beamforming or joint transmission. In some examples, the inter-station communications manager 1345 may provide an X2 interface within an LTE/LTE-A wireless communication network technology to provide communication between base stations 105.

The code 1335 may include instructions to implement aspects of the present disclosure, including instructions to support wireless communications. The code 1335 may be stored in a non-transitory computer-readable medium such as system memory or other type of memory. In some cases, the code 1335 may not be directly executable by the processor 1340 but may cause a computer (e.g., when compiled and executed) to perform functions described herein.

Figure 14:
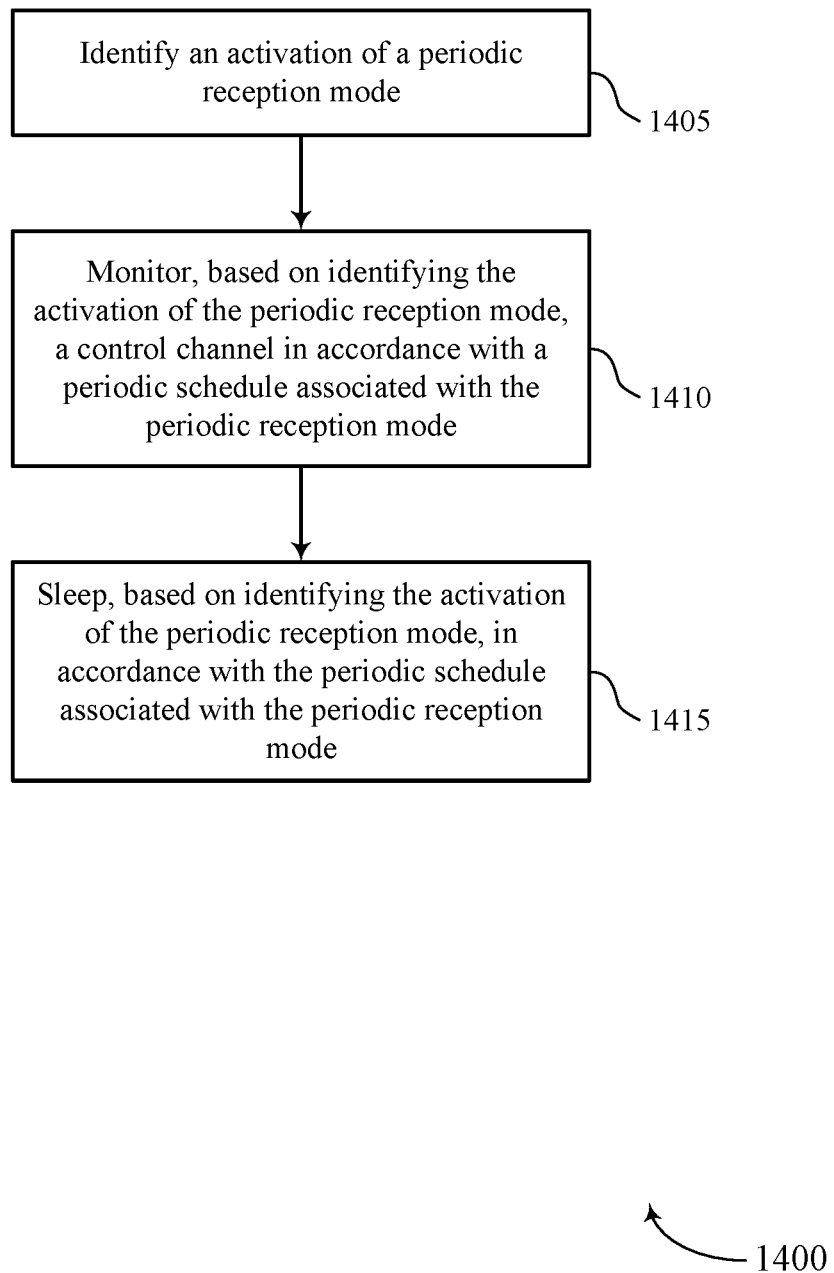
FIGS. 14 through 17 show flowcharts illustrating methods that support a periodic reception mode for wireless communications in accordance with aspects of the present disclosure.

FIG. 14 shows a flowchart illustrating a method 1400 that supports a periodic reception mode for wireless communications in accordance with aspects of the present disclosure. The operations of method 1400 may be implemented by a UE 115 or its components as described herein. For example, the operations of method 1400 may be performed by a communications manager as described with reference to FIGS. 6 through 9.

In some examples, a UE may execute a set of instructions to control the functional elements of the UE to perform the functions described herein. Additionally, or alternatively, a UE may perform aspects of the functions described herein using special-purpose hardware. At 1405, the UE may identify an activation of a periodic reception mode. The operations of 1405 may be performed according to the methods described herein. In some examples, aspects of the operations of 1405 may be performed by a signal receiving component as described with reference to FIGS. 6 through 9.

At 1410, the UE may monitor, based on identifying the activation of the periodic reception mode, a control channel in accordance with a periodic schedule associated with the periodic reception mode. The operations of 1410 may be performed according to the methods described herein. In some examples, aspects of the operations of 1410 may be performed by a monitoring component as described with reference to FIGS. 6 through 9. At 1415, the UE may sleep, based on identifying the activation of the periodic reception mode, in accordance with the periodic schedule associated with the periodic reception mode. The operations of 1415 may be performed according to the methods described herein. In some examples, aspects of the operations of 1415 may be performed by a sleeping component as described with reference to FIGS. 6 through 9.

Figure 15:
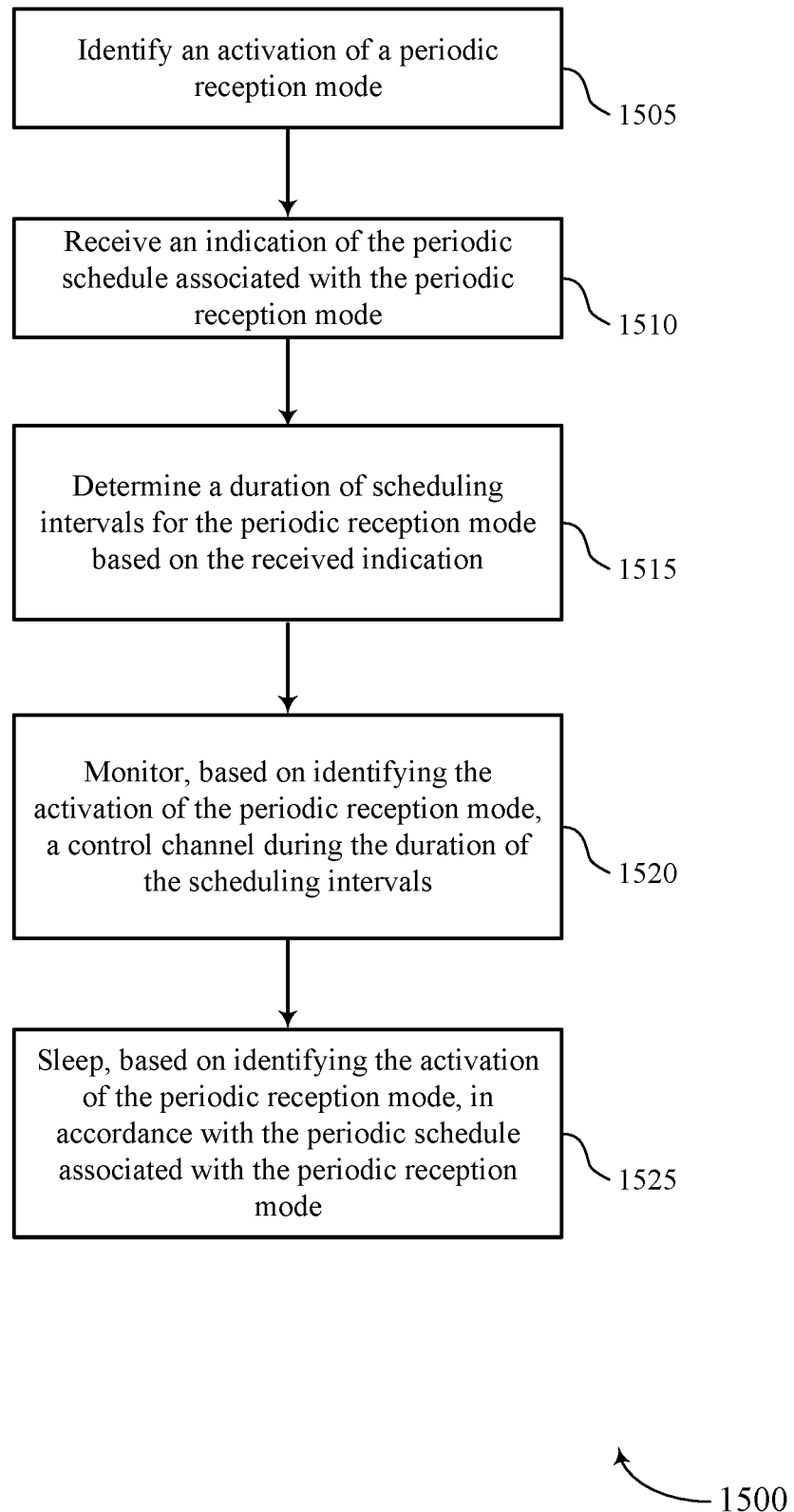

FIG. 15 shows a flowchart illustrating a method 1500 that supports a periodic reception mode for wireless communications in accordance with aspects of the present disclosure. The operations of method 1500 may be implemented by a UE 115 or its components as described herein. For example, the operations of method 1500 may be performed by a communications manager as described with reference to FIGS. 6 through 9.

In some examples, a UE may execute a set of instructions to control the functional elements of the UE to perform the functions described herein. Additionally, or alternatively, a UE may perform aspects of the functions described herein using special-purpose hardware. At 1505, the UE may identify an activation of a periodic reception mode. For example, the UE may receive an activation signal for the periodic reception mode. The operations of 1505 may be performed according to the methods described herein. In some examples, aspects of the operations of 1505 may be performed by a signal receiving component as described with reference to FIGS. 6 through 9.

At 1510, the UE may receive an indication of the periodic schedule associated with the periodic reception mode. The operations of 1510 may be performed according to the methods described herein. In some examples, aspects of the operations of 1510 may be performed by an indication component as described with reference to FIGS. 6 through 9. At 1515, the UE may determine a duration of scheduling intervals for the periodic reception mode based on the received indication. The operations of 1515 may be performed according to the methods described herein. In some examples, aspects of the operations of 1515 may be performed by a duration component as described with reference to FIGS. 6 through 9.

At 1520, the UE may monitor, based on identifying the activation of the periodic reception mode, a control channel during the duration of the scheduling intervals. The operations of 1520 may be performed according to the methods described herein. In some examples, aspects of the operations of 1520 may be performed by a monitoring component as described with reference to FIGS. 6 through 9. At 1525, the UE may sleep, based on identifying the activation of the periodic reception mode, in accordance with the periodic schedule associated with the periodic reception mode. The operations of 1525 may be performed according to the methods described herein. In some examples, aspects of the operations of 1525 may be performed by a sleeping component as described with reference to FIGS. 6 through 9.

Figure 16:
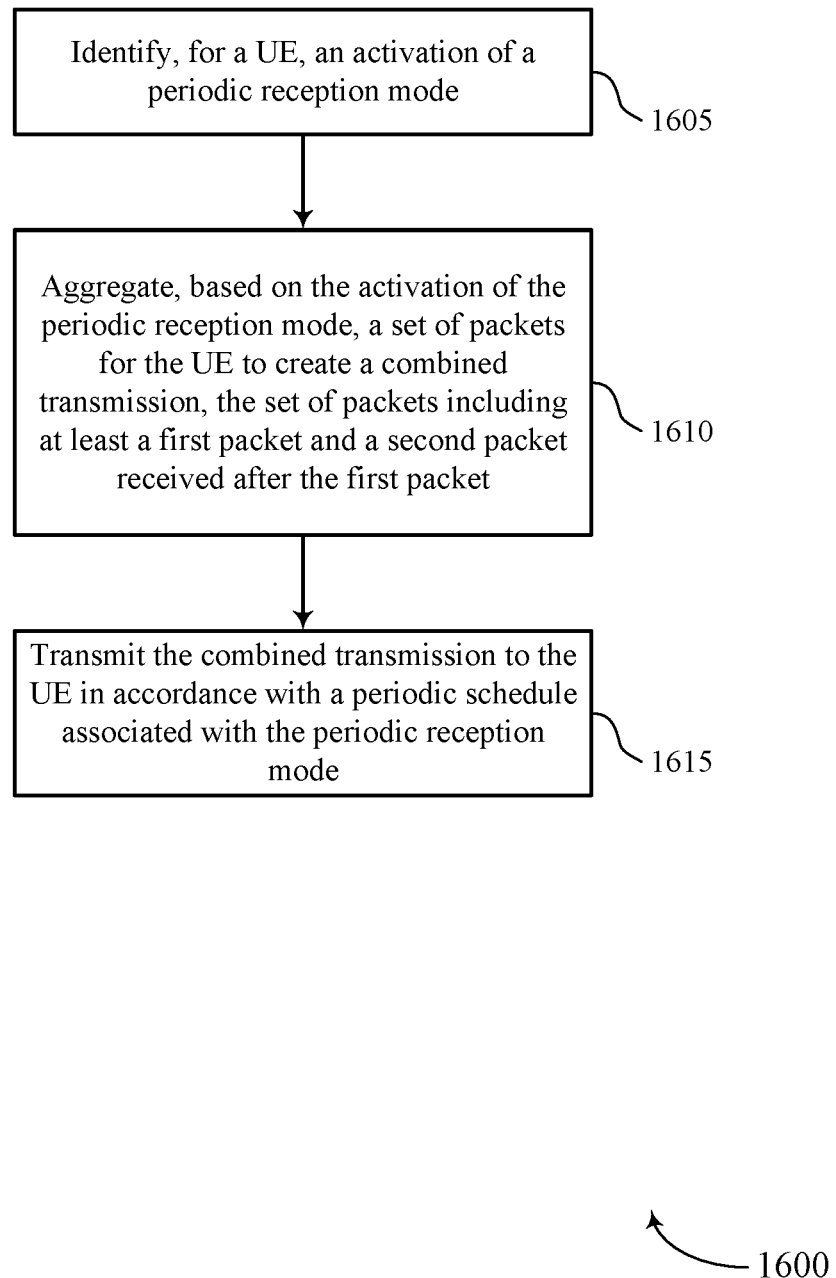

FIG. 16 shows a flowchart illustrating a method 1600 that supports a periodic reception mode for wireless communications in accordance with aspects of the present disclosure. The operations of method 1600 may be implemented by a base station 105 or its components as described herein. For example, the operations of method 1600 may be performed by a communications manager as described with reference to FIGS. 10 through 13. In some examples, a base station may execute a set of instructions to control the functional elements of the base station to perform the functions described herein. Additionally, or alternatively, a base station may perform aspects of the functions described herein using special-purpose hardware.

At 1605, the base station may identify, for a UE, an activation of a periodic reception mode. In some cases, the base station may transmit, to a UE, an activation signal for a periodic reception mode. The operations of 1605 may be performed according to the methods described herein. In some examples, aspects of the operations of 1605 may be performed by an activation signal component as described with reference to FIGS. 10 through 13.

At 1610, the base station may aggregate, based on the activation of the periodic reception mode, a set of packets for the UE to create a combined transmission, the set of packets including at least a first packet and a second packet received after the first packet. The operations of 1610 may be performed according to the methods described herein. In some examples, aspects of the operations of 1610 may be performed by an aggregation component as described with reference to FIGS. 10 through 13.

At 1615, the base station may transmit the combined transmission to the UE in accordance with a periodic schedule associated with the periodic reception mode. The operations of 1615 may be performed according to the methods described herein. In some examples, aspects of the operations of 1615 may be performed by a transmitting component as described with reference to FIGS. 10 through 13.

Figure 17:
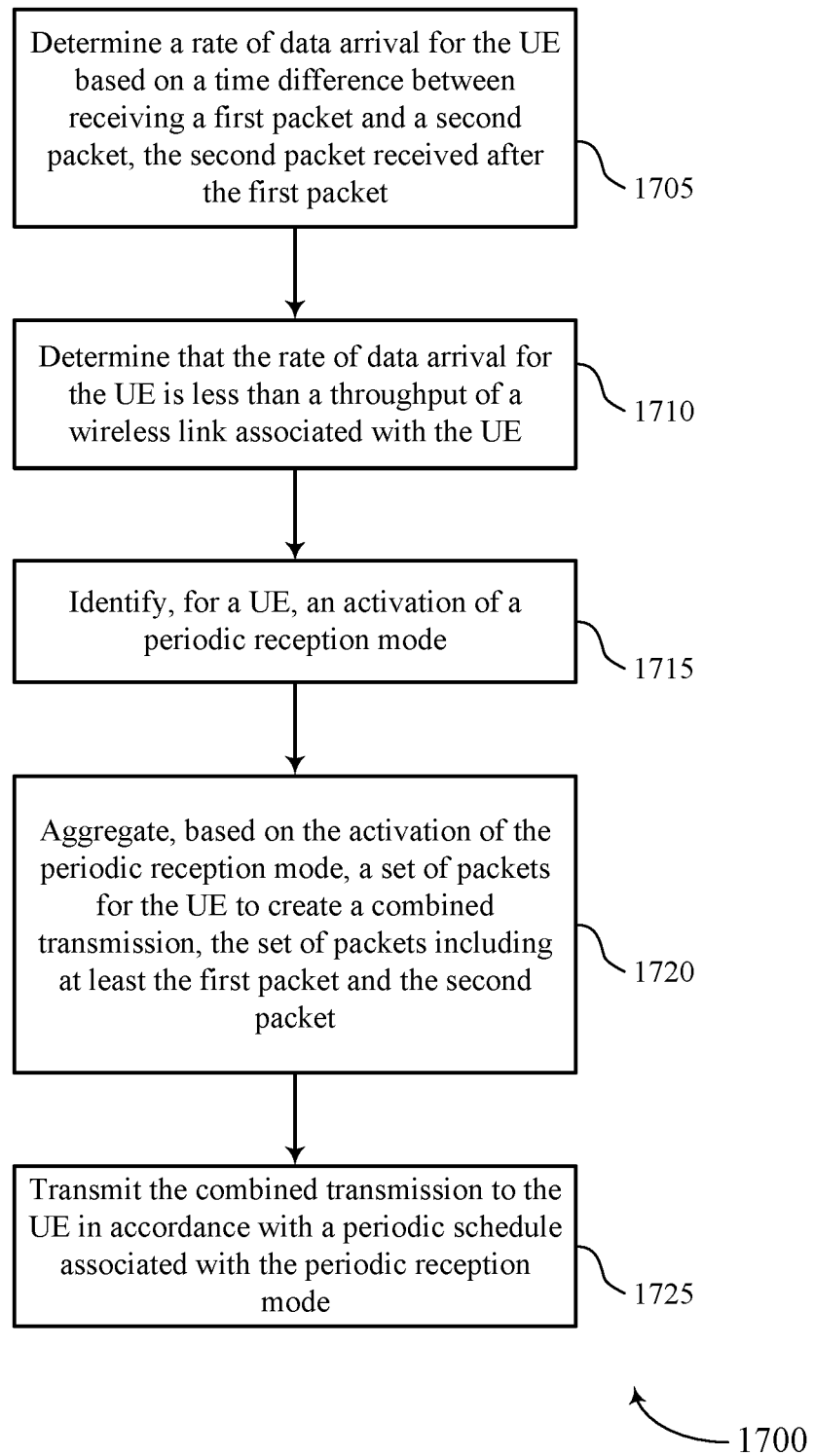

FIG. 17 shows a flowchart illustrating a method 1700 that supports a periodic reception mode for wireless communications in accordance with aspects of the present disclosure. The operations of method 1700 may be implemented by a base station 105 or its components as described herein. For example, the operations of method 1700 may be performed by a communications manager as described with reference to FIGS. 10 through 13.

In some examples, a base station may execute a set of instructions to control the functional elements of the base station to perform the functions described herein. Additionally, or alternatively, a base station may perform aspects of the functions described herein using special-purpose hardware. At 1705, the base station may determine a rate of data arrival for the UE based on a time difference between receiving a first packet and a second packet, the second packet received after the first packet. The operations of 1705 may be performed according to the methods described herein. In some examples, aspects of the operations of 1705 may be performed by a rate of arrival component as described with reference to FIGS. 10 through 13.

At 1710, the base station may determine that the rate of data arrival for the UE is less than a throughput of a wireless link associated with the UE. The operations of 1710 may be performed according to the methods described herein. In some examples, aspects of the operations of 1710 may be performed by a rate of arrival component as described with reference to FIGS. 10 through 13. At 1715, the base station may identify, for a UE, an activation of a periodic reception mode. The operations of 1715 may be performed according to the methods described herein. In some examples, aspects of the operations of 1705 may be performed by an activation signal component as described with reference to FIGS. 10 through 13.

At 1720, the base station may aggregate, based on the activation of the periodic reception mode, a set of packets for the UE to create a combined transmission, the set of packets including at least the first packet and the second packet. The operations of 1720 may be performed according to the methods described herein. In some examples, aspects of the operations of 1720 may be performed by an aggregation component as described with reference to FIGS. 10 through 13. At 1725, the base station may transmit the combined transmission to the UE in accordance with a periodic schedule associated with the periodic reception mode. The operations of 1725 may be performed according to the methods described herein. In some examples, aspects of the operations of 1725 may be performed by a transmitting component as described with reference to FIGS. 10 through 13.

It should be noted that the methods described herein describe possible implementations, and that the operations and the steps may be rearranged or otherwise modified and that other implementations are possible. Further, aspects from two or more of the methods may be combined.

Techniques described herein may be used for various wireless communications systems such as CDMA, TDMA, FDMA, OFDMA, single carrier frequency division multiple access (SC-FDMA), and other systems. A CDMA system may implement a radio technology such as CDMA2000, universal terrestrial radio access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), E-UTRA, Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs with service subscriptions with the network provider. A small cell may be associated with a lower-powered base station, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations. As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates a disjunctive list such that, for example, a list of "at least one of A, B, or C" means A or B or C or AB or AC or BC or ABC (i.e., A and B and C).

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communication, comprising:
identifying an activation of a periodic reception mode associated with scheduling intervals having a duration;
determining a recommended duration of scheduling cycles based at least in part on the activation of the periodic reception mode, the duration of the scheduling intervals, and a rate of downlink data arrival at a UE;
determining whether the recommended duration is less than or greater than a latency tolerance for data associated with an application;
indicating, to a network device different than the UE and based at least in part on the activation of the periodic reception mode, the recommended duration and a request for increased bandwidth based at least in part on the recommended duration being less than the latency tolerance or a request for decreased bandwidth based at least in part on the recommended duration being greater than the latency tolerance;
monitoring, during the scheduling intervals, a control channel in accordance with a periodic schedule for control channel signaling based at least in part on the recommended duration; and
sleeping, based at least in part on identifying the activation of the periodic reception mode, in accordance with the periodic schedule associated with the periodic reception mode.

2. The method of claim 1, further comprising:
receiving an indication of the periodic schedule associated with the periodic reception mode; and
determining the duration of the scheduling intervals for the periodic reception mode based at least in part on the received indication.

3. The method of claim 2, wherein the duration of the scheduling intervals is based at least in part on a scheduling load at the network device.

4. The method of claim 2, further comprising:
determining a duration of the scheduling cycles for the periodic reception mode based at least in part on the received indication, wherein a scheduling cycle includes a respective scheduling interval, and wherein sleeping in accordance with the periodic schedule comprises sleeping during a portion of the scheduling cycle outside the respective scheduling interval.

5. The method of claim 1, further comprising:
determining a recommended value of a parameter associated with the periodic schedule; and
transmitting, to the network device, the recommended value of the parameter associated with the periodic schedule.

6. The method of claim 5, wherein the recommended value of the parameter comprises the recommended duration of the scheduling cycles for the periodic reception mode, a recommended duration of scheduling intervals for the periodic reception mode, a recommended duration of a periodic reception inactivity timer for the periodic reception mode, or any combination thereof.

7. The method of claim 1, further comprising:
receiving, from the network device, an indication of the duration of the scheduling intervals for monitoring the control channel while in the periodic reception mode, wherein the scheduling intervals are subsets of scheduling cycles for the periodic reception mode; and
determining the recommended duration of the scheduling cycles based at least in part on the duration of the scheduling intervals, a throughput of a wireless link associated with the network device, the rate of downlink data arrival, the latency tolerance for the application associated with the data, or any combination thereof.

8. The method of claim 7, wherein determining the recommended duration comprises:
determining the recommended duration based at least in part on a ratio between the throughput of the wireless link and the rate of downlink data arrival.

9. The method of claim 1, wherein identifying the activation of the periodic reception mode comprises:
receiving an activation signal for the periodic reception mode, wherein the activation signal comprises:
a medium access control (MAC) layer control element indicating the activation of the periodic reception mode, the MAC layer control element indicating one or more parameter values associated with the periodic schedule;
a downlink control information (DCI) indicating the activation of the periodic reception mode, the DCI indicating one or more parameter values associated with the periodic schedule; or
a radio resource control (RRC) configuration message that indicates one or more parameter values associated with the periodic schedule.

10. The method of claim 1, further comprising:
initializing a periodic reception inactivity timer based at least in part on identifying the activation of the periodic reception mode.

11. The method of claim 10, further comprising:
receiving data while monitoring the control channel in accordance with the periodic schedule; and
restarting the periodic reception inactivity timer after receiving the data.

12. The method of claim 10, further comprising:
determining an expiration of the periodic reception inactivity timer; and
resuming a continuous monitoring mode based at least in part on the expiration of the periodic reception inactivity timer.

13. The method of claim 10, further comprising:
determining an expiration of the periodic reception inactivity timer; and
switching from the periodic reception mode to a discontinuous reception (DRX) mode based at least in part on the expiration of the periodic reception inactivity timer.

14. The method of claim 1, further comprising:
receiving, at a UE from the network device, a wake up signal before a scheduling interval indicating a presence of data for the UE, wherein monitoring the control channel in accordance with the periodic schedule is based at least in part on the wake up signal; and
receiving a medium access control (MAC) layer control element indicating deactivation of the periodic reception mode.

15. The method of claim 1, further comprising:
transmitting a scheduling request during a first scheduling interval of the periodic reception mode, the scheduling request comprising a request to schedule uplink transmission during the first scheduling interval or during a second scheduling interval of the periodic reception mode that is after the first scheduling interval.

16. The method of claim 1, further comprising:
receiving an indication of a hybrid automatic repeat request (HARQ) configuration for the periodic reception mode;
identifying a HARQ transmission associated with a scheduling interval of the periodic reception mode, wherein identifying the activation of the periodic reception mode comprises identifying the indication of the HARQ configuration for the periodic reception mode; and
communicating with the network device based at least in part on the HARQ configuration for the periodic reception mode, wherein communicating based at least in part on the HARQ configuration comprises at least one of extending the scheduling interval to accommodate the HARQ transmission or exchanging the HARQ transmission with the network device during a subsequent scheduling interval.

17. A method for wireless communication, comprising:
identifying, for a user equipment (UE), an activation of a periodic reception mode;
determining, based at least in part on the activation of the periodic reception mode, that a rate at which downlink data for the UE arrives at a network device different than the UE from a network is less than a throughput of a wireless link from the network device to the UE;
aggregating, based at least in part on the rate of downlink data arrival for the UE being less than the throughput of the wireless link associated with the UE, a plurality of packets for the UE to create a combined transmission, the plurality of packets comprising at least a first packet and a second packet received after the first packet; and
transmitting the combined transmission to the UE in accordance with a periodic schedule associated with the periodic reception mode.

18. The method of claim 17, further comprising:
buffering the first packet of the plurality of packets for a duration of time based at least in part on the periodic schedule.

19. The method of claim 17, further comprising:
determining a duration of scheduling intervals for the periodic reception mode based at least in part on a scheduling load; and
transmitting an indication of the determined duration of the scheduling intervals to the UE, wherein transmitting the combined transmission to the UE in accordance with the periodic schedule comprises transmitting the combined transmission to the UE during a scheduling interval.

20. The method of claim 17, further comprising:
transmitting an indication of a duration of scheduling cycles for the periodic reception mode, wherein a scheduling cycle includes a respective scheduling interval; and
configuring the UE to sleep during a portion of the scheduling cycle outside the respective scheduling interval.

21. The method of claim 17, further comprising:
receiving, from the UE, a recommended value of a parameter associated with the periodic schedule, the recommended value of the parameter comprising a recommended duration of scheduling intervals for the periodic reception mode, a recommended duration of scheduling cycles for the periodic reception mode, a recommended duration of an inactivity timer for the periodic reception mode, or any combination thereof; and
determining a value of the parameter associated with the periodic schedule based at least in part on the recommended value.

22. The method of claim 17, further comprising:
transmitting, to the UE, an indication of a duration of scheduling intervals for the periodic reception mode, wherein scheduling intervals are subsets of scheduling cycles for the periodic reception mode; and
receiving from the UE, an indication of a recommended duration of scheduling cycles, the recommended duration of scheduling cycles based at least in part on a wireless throughput associated with the UE, the rate of downlink data arrival for the UE, a latency tolerance for an application associated with the downlink data, or any combination thereof.

23. The method of claim 22, further comprising:
receiving, from the UE, a request for increased bandwidth based at least in part on the recommended duration of scheduling cycles being less than the latency tolerance or a request for reduced bandwidth based at least in part on the recommended duration of scheduling cycles being greater than the latency tolerance.

24. The method of claim 17, wherein aggregating the plurality of packets to create the combined transmission comprises:
forming a single packet based at least in part on the plurality of packets, wherein the combined transmission comprises the single packet; or
forming a burst of packets based at least in part on the plurality of packets, wherein the combined transmission comprises the burst of packets.

25. The method of claim 17, further comprising:
transmitting, to the UE, an activation signal for the periodic schedule, wherein the activation signal comprises:
a medium access control (MAC) layer control element indicating the activation of the periodic reception mode, the MAC layer control element indicating one or more parameter values associated with the periodic schedule;
a downlink control information (DCI) indicating the activation of the periodic reception mode, the DCI indicating one or more parameter values associated with the periodic schedule; or
a radio resource control (RRC) configuration message that indicates one or more parameter values associated with the periodic schedule.

26. The method of claim 17, further comprising:
transmitting, to the UE, a wake up signal indicating a presence of data for the UE, wherein transmitting the combined transmission in accordance with the periodic schedule is based at least in part on the wake up signal;
receiving, from the UE, a scheduling request during a first scheduling interval of the periodic reception mode, the scheduling request comprising a request to schedule uplink transmission during the first scheduling interval or during a second scheduling interval of the periodic reception mode that is after the first scheduling interval; and
transmitting, to the UE, a medium access control (MAC) layer control element indicating deactivation of the periodic reception mode.

27. An apparatus for wireless communication, comprising:
a processor,
memory in electronic communication with the processor; and
instructions stored in the memory and executable by the processor to cause the apparatus to:
identify an activation of a periodic reception mode associated with scheduling intervals having a duration;
determine a recommended duration of scheduling cycles based at least in part on the activation of the periodic reception mode, the duration of the scheduling intervals, and a rate of downlink data arrival at a UE;
determine whether the recommended duration is less than or greater than a latency tolerance for data associated with an application;
indicate, to a network device different than the UE and based at least in part on the activation of the periodic reception mode, the recommended duration and a request for increased bandwidth based at least in part on the recommended duration being less than the latency tolerance or a request for decreased bandwidth based at least in part on the recommended duration being greater than the latency tolerance;
monitor, during the scheduling intervals, a control channel in accordance with a periodic schedule for control channel signaling based at least in part on the recommended duration; and
sleep, based at least in part on identifying the activation of the periodic reception mode, in accordance with the periodic schedule associated with the periodic reception mode.

28. An apparatus for wireless communication, comprising:
a processor,
memory in electronic communication with the processor; and
instructions stored in the memory and executable by the processor to cause the apparatus to:
identify, for a user equipment (UE), an activation of a periodic reception mode;
determine, based at least in part on the activation of the periodic reception mode, that a rate at which downlink data for the UE arrives at a network device different than the UE from a network is less than a throughput of a wireless link from the base-station network device to the UE;
aggregate, based at least in part on the rate of downlink data arrival for the UE being less than the throughput of the wireless link associated with the UE, a plurality of packets for the UE to create a combined transmission, the plurality of packets comprising at least a first packet and a second packet received after the first packet; and
transmit the combined transmission to the UE in accordance with a periodic schedule associated with the periodic reception mode.

* * * * *